(12) United States Patent
Mitomi

(10) Patent No.: US 11,061,610 B2
(45) Date of Patent: Jul. 13, 2021

(54) MEMORY SYSTEM

(71) Applicant: Toshiba Memory Corporation, Tokyo (JP)

(72) Inventor: Hiroyuki Mitomi, Yokohama Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 9 days.

(21) Appl. No.: 16/271,555

(22) Filed: Feb. 8, 2019

(65) Prior Publication Data

US 2019/0384531 A1 Dec. 19, 2019

(30) Foreign Application Priority Data

Jun. 14, 2018 (JP) .............................. JP2018-113505

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
None
See application file for complete search history.

(56) References Cited

U.S. PATENT DOCUMENTS

| 8,489,802 | B2 | 7/2013 | Fujimoto |
| 8,526,241 | B2* | 9/2013 | Shirakawa ......... G11C 16/0483 365/185.23 |
| 9,128,822 | B2 | 9/2015 | Michael et al. |
| 10,175,889 | B2* | 1/2019 | Aga ..................... G06F 12/0246 |
| 2011/0202554 | A1* | 8/2011 | Powilleit ................ H04L 41/24 707/769 |

FOREIGN PATENT DOCUMENTS

| JP | 5193822 B2 | 5/2013 |
| JP | 5377526 B2 | 12/2013 |

* cited by examiner

*Primary Examiner* — Midys Rojas
(74) *Attorney, Agent, or Firm* — Kim & Stewart LLP

(57) ABSTRACT

A memory system includes a controller and a semiconductor storage device a semiconductor storage device including a nonvolatile memory having a plurality of blocks and configured to execute commands from the controller. In response to a write command from the controller to write data into a block of the nonvolatile memory, the semiconductor storage device performs a write operation to write the data into the block of the nonvolatile memory, and upon detecting failure of writing the data into the block, the semiconductor storage device performs another write operation to write the data without notifying the controller of the failure of writing the data into the block.

18 Claims, 25 Drawing Sheets

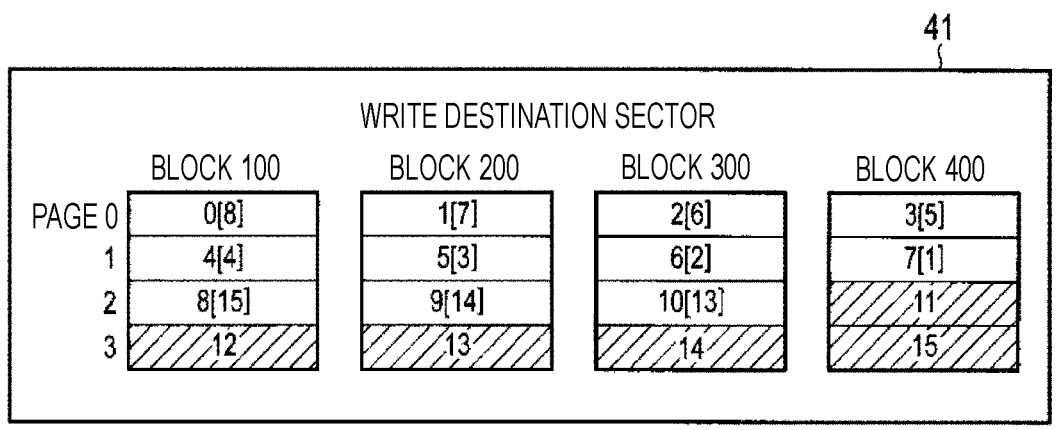

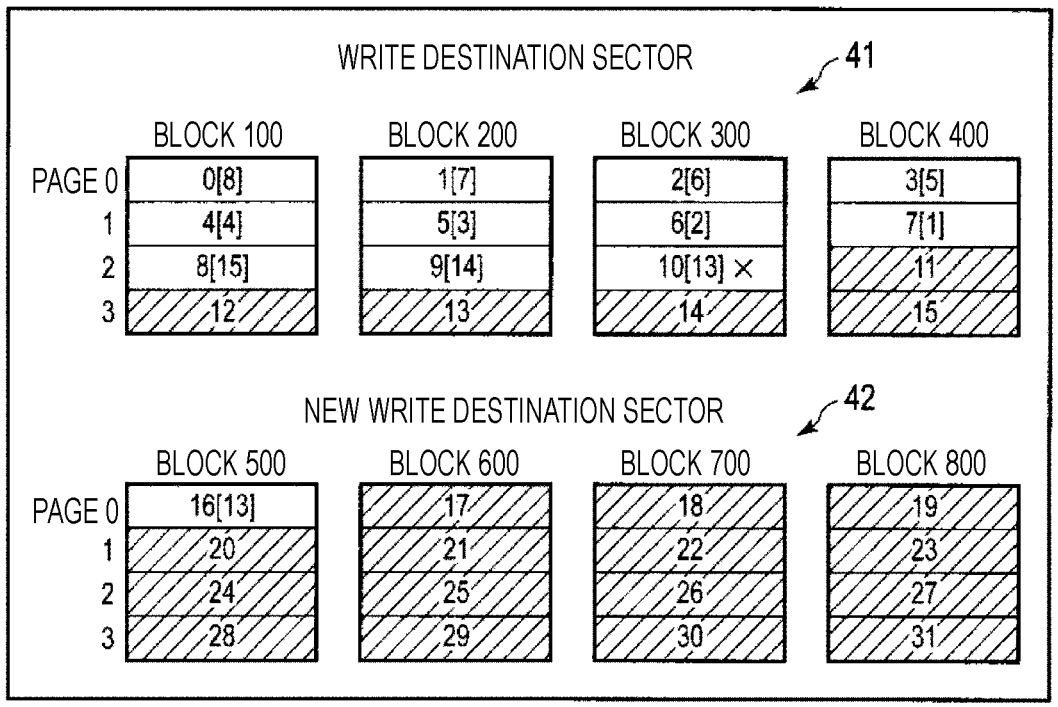

FIG. 20A
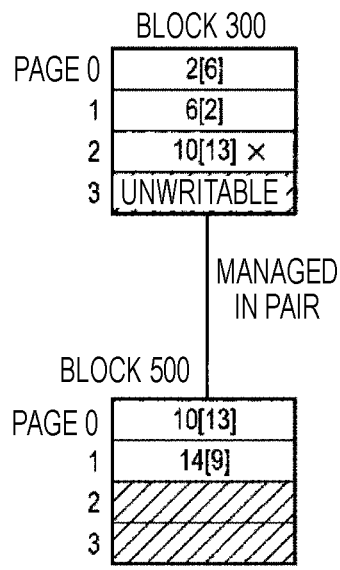
FIG. 20B
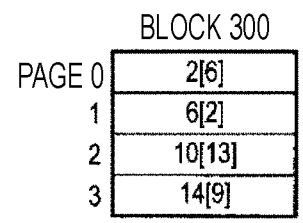
IMAGE FROM OUTSIDE OF BLOCK
WHERE REPLACEMENT OCCURS
FIG. 21
| WRITE POSITION | REPLACEMENT POSITION |
|---|---|
| 300-2 | 500 |
|  |  |
|  |  |
|  |  |
↖ 38

| WRITE FAILURE POSITION | REPLACEMENT POSITION |
|---|---|
| 300-1 | 500-1 |
|  |  |
|  |  |
|  |  |

38

MEMORY SYSTEM

CROSS-REFERENCE TO RELATED APPLICATIONS

This application is based upon and claims the benefit of priority from Japanese Patent Application No. 2018-113505, filed Jun. 14, 2018, the entire contents of which are incorporated herein by reference.

FIELD

Embodiments described herein relate generally to a memory system including a nonvolatile memory.

BACKGROUND

In recent years, memory systems including nonvolatile memory have been widely distributed. As one of such memory systems, a solid state drive (SSD) including a NAND type flash memory is known. An SSD is used as the main storage for various computing devices.

The SSD includes, for example, a semiconductor storage device that includes a nonvolatile memory such as a NAND type flash memory and a memory controller that controls various types of accesses, such as write and read, to the semiconductor storage device. For example, data is written to the semiconductor storage device in response to a write request by the memory controller.

When such a write operation fails, the semiconductor storage device notifies the memory controller of the failure. In response to the notification, the memory controller requests writing of the data to the semiconductor storage device again, and the data is written to the semiconductor storage device again in response to the request.

DESCRIPTION OF THE DRAWINGS

FIG. 11 is a diagram illustrating an example in which data is further written to the sector of FIG. 9.

FIG. 12 is a diagram illustrating an example of a logical-to-physical address conversion table corresponding to the write of FIG. 11.

FIG. 13 is a diagram illustrating an example in which data is written to another sector when a write failure occurs in the write of FIG. 11.

FIG. 14 is a diagram illustrating an example of a logical-to-physical address conversion table corresponding to the write of FIG. 13.

FIGS. 20A and 20B are diagrams illustrating replacement of a block at the time of write failure by the semiconductor storage device of FIG. 15 and an image from outside of the block where a replacement occurs.

FIG. 21 is a diagram illustrating an example of a replacement table used by the semiconductor storage device of FIG. 15.

DETAILED DESCRIPTION

Embodiments provide a memory system that efficiently rewrites data after a failure in writing data to a semiconductor storage device.

In general, according to one embodiment, the memory system includes a controller and a semiconductor storage device including a nonvolatile memory having a plurality of blocks and configured to execute commands from the controller. In response to a write command from the controller to write data into a block of the nonvolatile memory, the semiconductor storage device performs a write operation to write the data into the block of the nonvolatile memory, and upon detecting failure of writing the data into the block, the semiconductor storage device performs another write operation to write the data without notifying the controller of the failure of writing the data into the block.

Hereinafter, an embodiment will be described with reference to the accompanying drawings.

First Embodiment

Figure 1:
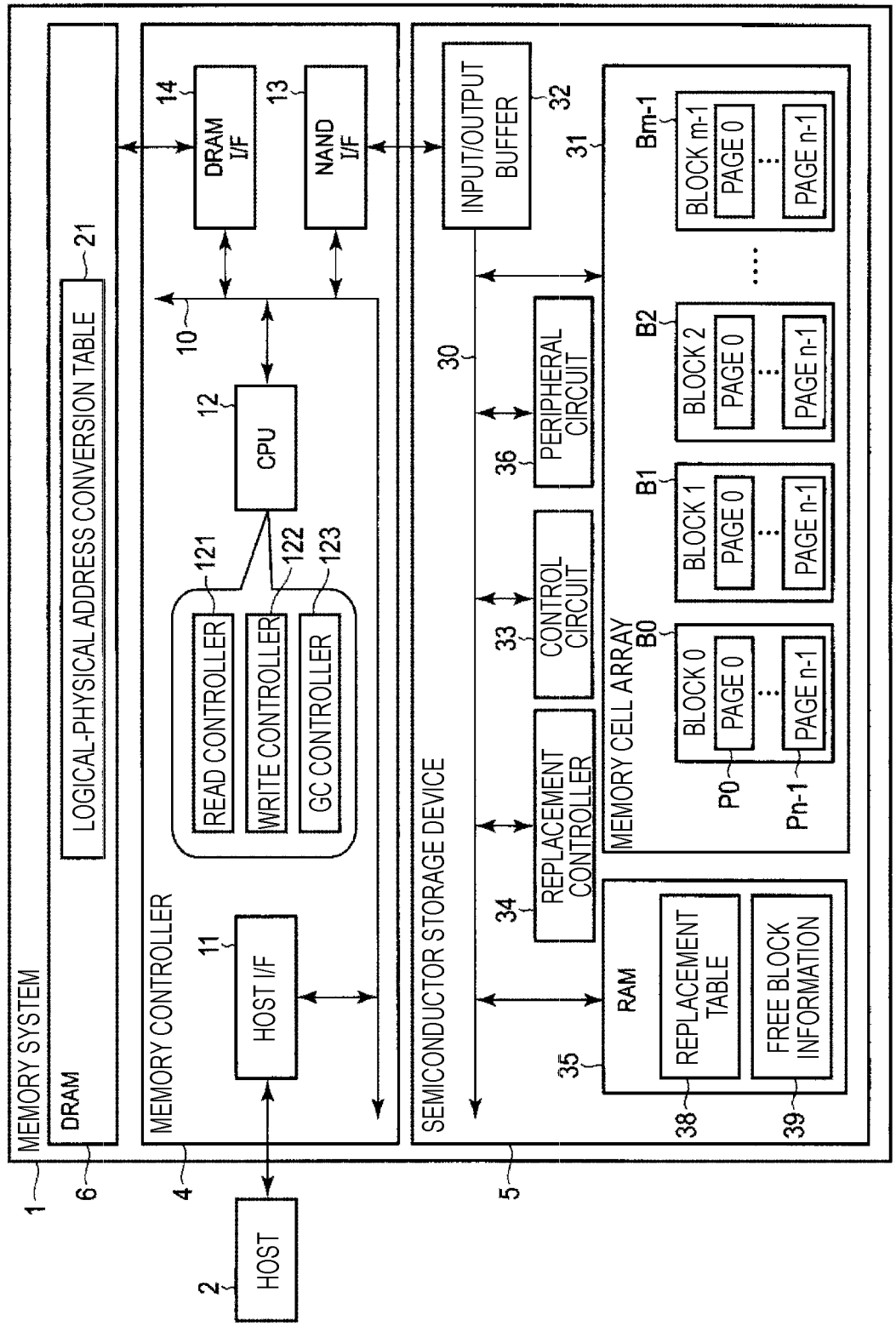
FIG. 1 is a block diagram illustrating an example of the configuration of a memory system according to a first embodiment.

First, the configuration of a memory system 1 according to a first embodiment will be described with reference to FIG. 1.

The memory system 1 includes one or more semiconductor storage devices 5 configured to write data to a nonvolatile memory and read data from the nonvolatile memory. The memory system 1 may constitute a computer system including a host 2 that accesses the memory system 1.

The host 2 is an information processing device that accesses the memory system 1. The host 2 may be a server that stores large amounts of various data in the memory system 1, or may be a personal computer. The memory system 1 may be implemented, for example, as a solid state drive (SSD) including a NAND type flash memory.

The memory system 1 may be used as the main storage of an information processing device that functions as the host 2. The memory system 1 may be embedded in the information processing device or may be connected to the information processing device via a cable or a network.

As for the interface that interconnects the host 2 and the memory system 1, an SCSI, a serial attached SCSI (SAS), an ATA, a serial ATA (SATA), a PCI Express® (PCIe), an Ethernet®, a Fibre channel, an NVM Express® (NVMe), or the like may be used.

The memory system 1 includes a semiconductor storage device 5 and a memory controller 4 electrically connected to the semiconductor storage device 5. The semiconductor storage device 5 includes a memory cell array 31 of the nonvolatile memory. This nonvolatile memory is, for example, a NAND type flash memory, and the semiconductor storage device 5 is, for example, a NAND type flash memory chip.

The memory controller 4 may be implemented as a circuit such as a system-on-a-chip (SoC). The memory system 1 may also include a random access memory which is a volatile memory such as, for example, a DRAM 6. Alternatively, a random access memory such as an SRAM may be embedded in the memory controller 4.

A cache area of the logical-to-physical address conversion table 21 is provided in the random access memory such as the DRAM 6. The logical-to-physical address conversion table 21 stores a mapping between each of the logical addresses specified by the host 2 and each of the physical addresses of the semiconductor storage device 5 (more specifically, the memory cell array 31) and is implemented, for example, as a lookup table (LUT). The random access memory such as the DRAM 6 may also be provided with a read buffer which is a buffer area configured to temporarily store data read from the semiconductor storage device 5, a write buffer which is a buffer area configured to temporarily store data to be written to the semiconductor storage device 5, a GC buffer which is a buffer area configured to temporarily store data used for garbage collection (GC) (compaction), and a storage area which stores various types of information used for the block management (e.g., the number of program/erase (P/E) cycles to be described later). Further, the DRAM 6 may be provided in the memory controller 4.

The memory controller 4 is electrically connected to the semiconductor storage device 5 via a NAND interface 13 that corresponds to an interface standard such as a toggle DDR or an open NAND flash interface (ONFI). The NAND interface 13 is a NAND control circuit configured to control the semiconductor storage device 5.

The memory controller 4 is a memory controller configured to control the semiconductor storage device 5.

The memory controller 4 may also include a flash translation layer (FTL) configured to execute data management and block management of the semiconductor storage device 5. The data management executed by the FTL includes, for example, (1) management of mapping information indicating a correspondence relationship between each logical address and each physical address of the semiconductor storage device 5 and (2) a processing performed to conceal a read/write in page units and an erase operation in block units. A logical address is an address used by the host 2 to address the memory system 1. For example, a logical block address (LBA) is used as the logical address.

The management of the mapping between each logical address and each physical address is executed using the logical-to-physical address conversion table 21. The memory controller 4 uses the logical-to-physical address conversion table 21 to manage the mapping between each logical address and each physical address in a predetermined management size unit. A physical address corresponding to a logical address indicates a physical storage location in the semiconductor storage device 5 in which the data of the logical address is written. The logical-to-physical address conversion table 21 may be loaded from semiconductor storage device 5 to the DRAM 6 when the memory system 1 is powered on.

The semiconductor storage device 5 includes a memory cell array 31 including plural memory cells arranged in a matrix form. This memory cell array 31 includes plural blocks B0 to Bm-1. Each of the blocks B0 to Bm-1 includes plural pages (pages P0 to Pn-1 in this case). Blocks B0 to Bm-1 function as the minimum unit of data erasure. The blocks are sometimes called "erase blocks" or "physical blocks." Each of the pages P0 to Pn-1 includes plural memory cells connected to the same word line. The pages P0 to Pn-1 are the unit of the data write operation and the data read operation. The word line may also be used as the unit of the data write operation and the data read operation.

The maximum number of P/E cycles that is allowable for each of the blocks B0 to Bm-1 is limited. One P/E cycle of a block includes an erase operation to erase all memory cells in the block and a write operation to write data in each of the pages in the block.

Therefore, data is written only once to one page per P/E cycle. For this reason, the memory controller 4 writes update data corresponding to a certain logical address in a separate physical storage location, not the physical storage location where the previous data corresponding to the logical address is stored. The memory controller 4 then updates the logical-to-physical address conversion table 21 to associate the logical address with the separate physical storage location and invalidate the previous data. In the following, the data which is referred to from the logical-to-physical address conversion table 21 (i.e., the data associated with the logical address) is referred to as valid data. Also, data that is not associated with any logical address is referred to as invalid data. The valid data is data that may be read by the host 2 later. The invalid data is data that is not readable by the host 2.

Block management includes wear leveling, garbage collection (GC), and the like. In the present embodiment, management of defective blocks by the memory controller 4 is not necessary as will be described later.

The memory controller 4 may also include a host interface 11, a CPU 12, a NAND interface 13, a DRAM interface 14, and the like. The host interface 11, the CPU 12, the NAND interface 13, and the DRAM interface 14 may be interconnected via a bus 10.

The host interface 11 is a circuit that receives various commands from the host 2, for example, an I/O command, various control commands, and the like. The I/O command may include, for example, a write command, a read command, an unmap command (also known as a trim command), a format command, a flush command, and the like.

The DRAM interface 14 is a DRAM control circuit configured to control the access of the DRAM 6. The storage area of the DRAM 6 is allocated as the area configured to store the logical-to-physical address conversion table 21 and the areas used as a read buffer (not illustrated), a write buffer, a GC buffer, and the like.

The CPU 12 is a processor configured to control the host interface 11, the NAND interface 13, and the DRAM interface 14. The CPU 12 performs various processings by executing a control program (e.g., firmware) stored in a ROM (not illustrated) or the like. In addition to the FTL processing described above, the CPU 12 may execute a command processing or the like to process various commands from the host 2. The operation of the CPU 12 is controlled by the above-described firmware executed by the CPU 12. Further, a portion or all of the FTL processing and the command processing may be executed by dedicated hardware in the memory controller 4.

The CPU 12 is programmed to function as, for example, a read controller 121, a write controller 122, and a GC controller 123.

The read controller 121 requests the physical address corresponding to the logical address based on an entry in the logical-to-physical address conversion table 21 corresponding to the logical address, and reads the data corresponding to the read command from the semiconductor storage device 5.

The write controller 122 stores the user data received from the host 2 together with the write command in the write buffer in the DRAM 6. The write controller 122 also determines the physical address to which the user data needs to be written when the user data is requested by the write command to be written to a certain logical address. Then, the write controller 122 requests that the semiconductor storage device 5 write the user data to the block and page corresponding to the determined physical address. More specifically, the write controller 122 transmits information indicating the physical address (e.g., a block and a page) and user data to the semiconductor storage device 5.

Subsequently, the write controller 122 instructs the semiconductor storage device 5 to execute the program operation. That is, the write controller 122 sends a program command to the semiconductor storage device 5, thereby causing the semiconductor storage device 5 to write the transmitted user data to the block and the page of a write destination.

The memory cell array 31 in the semiconductor storage device 5 includes plural blocks. A block is categorized into a block which stores valid data (active block) and a block which does not store valid data and may be used to write new data by performing an erase processing (free block). One block is selected from one or more free blocks and allocated as a write destination block by performing an erase processing. In some cases, the write destination block may store valid data and have free space remaining.

In addition, the write controller 122 releases the area in which the transmitted user data in the write buffer is stored. The write controller 122 maps the logical address and the physical address. This mapping is written as an entry in the logical-to-physical address conversion table 21. The write controller 122 requests writing to the semiconductor storage device 5 and then, maps the logical address and the physical address before the writing by the semiconductor storage device 5 is completed, and uses the entry indicating the mapping to update the logical-to-physical address conversion table 21.

The GC controller 123 may also perform writing to the semiconductor storage device 5 using the GC buffer in the same manner as the write operation by the write controller 122 as described above. The GC controller 123 selects a garbage collection (GC) source block from an active block group that stores the valid data, and requests that the semiconductor storage device 5 write the valid data in the GC source block in a garbage collection (GC) destination block secured as the write destination from a free block group.

The semiconductor storage device 5 includes a memory cell array 31, an input/output buffer 32, a control circuit 33, a replacement controller 34, a RAM 35, a peripheral circuit 36, and the like. Various control signals, commands, addresses, and data, which are supplied from the memory controller 4 or to the memory controller 4 via the NAND interface 13, are stored in the input/output buffer 32. That is, the memory controller 4 and the semiconductor storage device 5 exchange control signals, commands, addresses, and data via the NAND interface 13 and the input/output buffer 32.

The memory cell array 31 includes plural blocks. The memory cell array 31 may have a characteristic that when writing to a certain page of a certain block fails, additional writing in a page subsequent to the failed page in the block is not able to be performed.

The control circuit 33 controls the data write operation, the erase operation, and the read operation based on various external control signals (a write enable signal, a read enable signal, a command latch enable signal, an address latch enable signal, etc.) and commands supplied from the memory controller 4 via the input/output buffer 32.

The peripheral circuit 36 cooperates with the control circuit 33 to control the generation of internal voltages and the like that are necessary to drive word lines and bit lines to perform write, erase, and read operations.

The replacement controller 34 may be implemented, for example, as a circuit. When the control circuit 33 fails to write data to a certain page of a certain block in the memory cell array 31, the replacement controller 34 allocates a replacement block for replacement to control the control circuit 33 and the like so that the data is written to the replacement block. When the writing of the data to a certain page in a certain block fails, the replacement controller 34 causes the data to not be written after that page of the block, and causes the data that should otherwise be written after that page to be written to the replacement block. In addition, when data is requested to be read from the page after the page on which writing has failed, the control circuit 33 causes data to be read from the page in the replacement block where data is actually written.

A replacement table 38 and free block information 39 are stored in the RAM 35.

In the replacement table 38, a write failure position where certain data should otherwise be written, and a replacement position secured in response to the write failure to the write failure position are written in association with each other.

Figure 2:
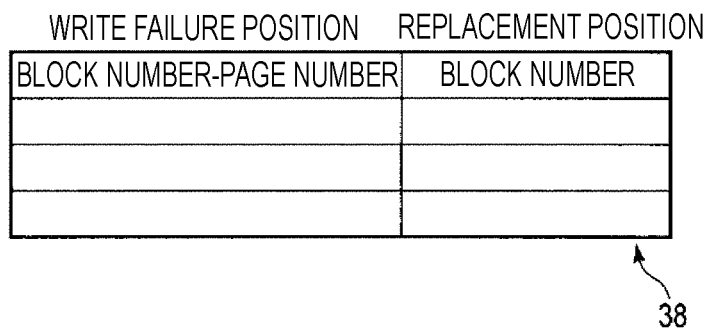
FIG. 2 is a diagram illustrating a configuration example of a replacement table used by the memory system according to the first embodiment.

For example, as illustrated in FIG. 2, the replacement table 38 may include one or more entries, each including a write failure location and a replacement location. The write failure position indicates the physical storage location where the write failed, for example, a block number and a page number. The replacement position indicates the physical storage location, for example, the block number, that replaces the write failure location. Alternatively, the write failure position may be represented by the block number, and the replacement position may be represented by the block number and the page number.

Also, the free block information 39 includes one or more block numbers corresponding to one or more free blocks that do not include valid data.

The replacement controller 34 selects a free block from one or more free blocks using the free block information 39 in response to the failure to write data to a certain page in a certain block, performs an erase processing on the selected block, and allocates the selected block as a replacement block. In some cases, the replacement block may already store valid data. The replacement controller 34 then adds, to the replacement table 38, an entry that includes the write failure location indicating the block and the page where the write failed, and the replacement location indicating the replacement block. In addition, the replacement controller 34 deletes the block number of the allocated replacement block from the free block information 39.

Referring to FIGS. 3 to 8, descriptions will be made on an example in which when the writing of data to a certain page in a certain block fails, data that should otherwise be written after the page is written to the replacement block in the semiconductor storage device 5.

Figure 3:
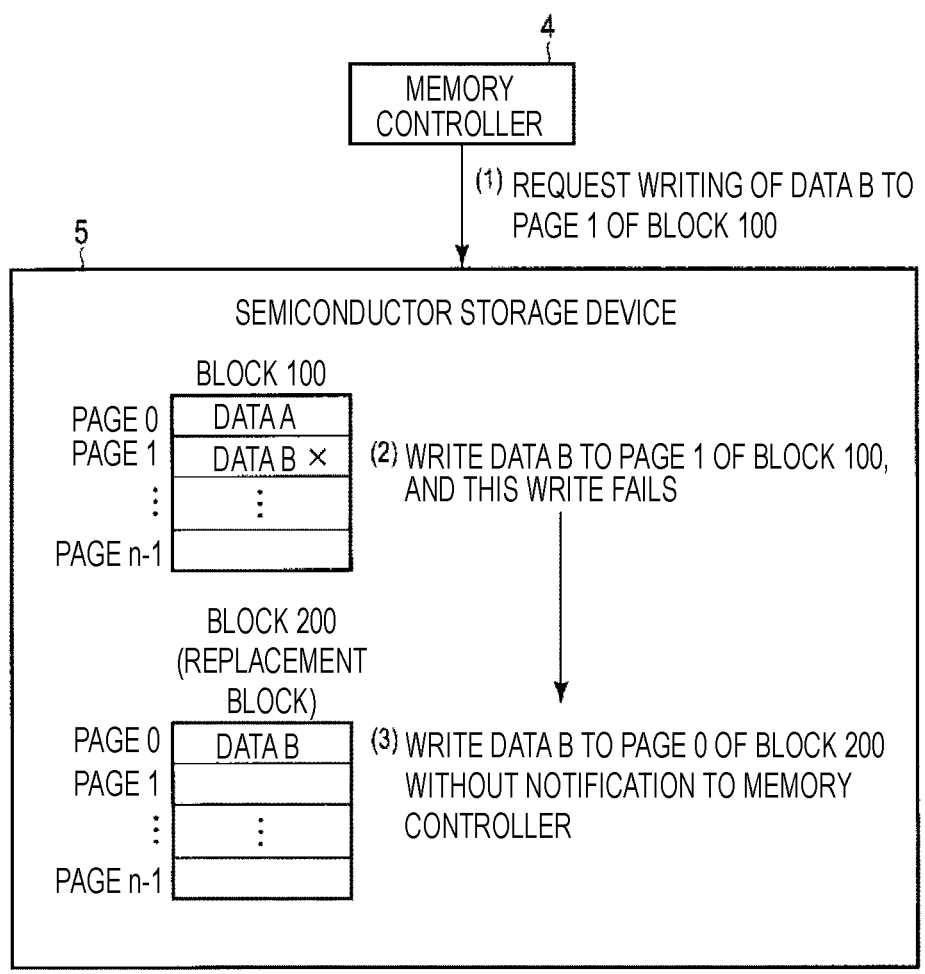
FIG. 3 is a diagram illustrating a first example in which a block is replaced at the time of write failure by the memory system according to the first embodiment.

As illustrated in FIG. 3, for example, when the memory controller 4 requests writing of data B to page 1 in block 100 in the memory cell array 31, the control circuit 33 and the peripheral circuit 36 carry out the write of the data B to page 1. When the writing of the data B to page 1 fails, the replacement controller 34 causes the data B to be written to a replacement block, e.g., block 200, in the memory cell array 31 without notifying the memory controller 4 of the failure of the writing. The data B is written to, for example, first page 0 of the block 200, as illustrated in FIG. 3.

Figure 4:
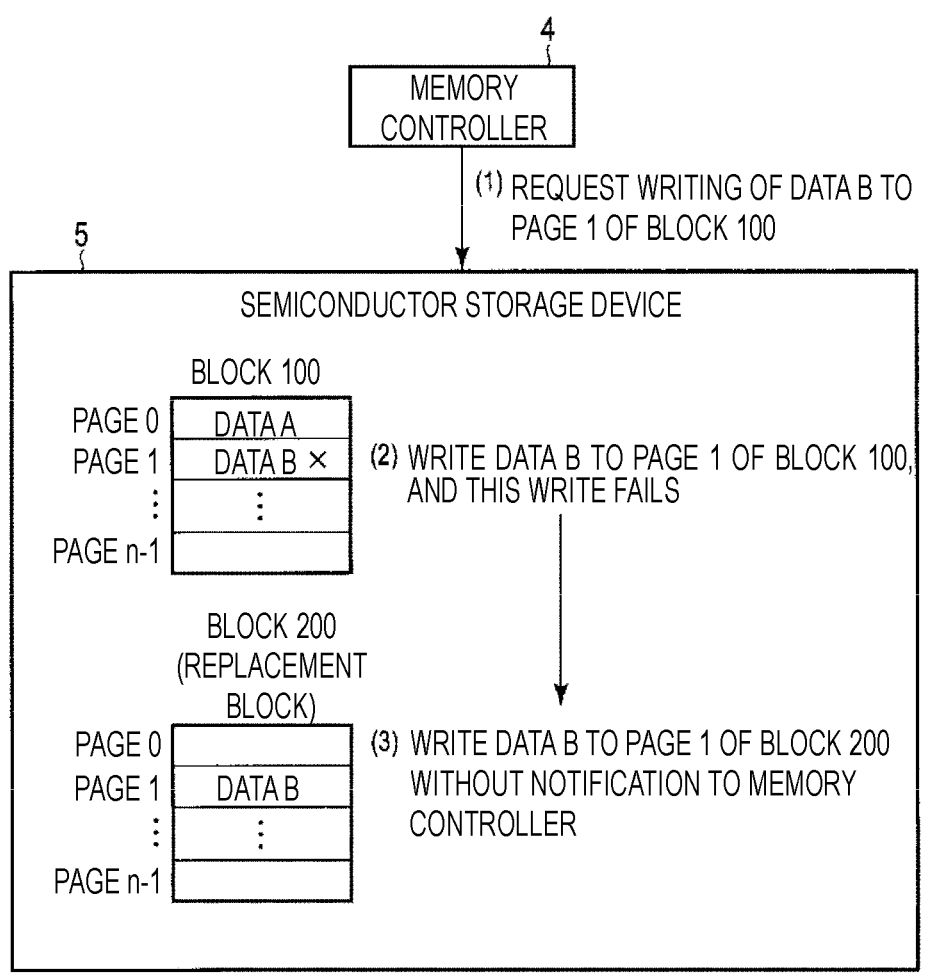
FIG. 4 is a diagram illustrating a second example in which a block is replaced at the time of write failure by the memory system according to the first embodiment.

Further, the data B may also be written to page 1 in the block 200, which has the same page number as page 1 where the write failed, as illustrated in FIG. 4.

Figure 5:
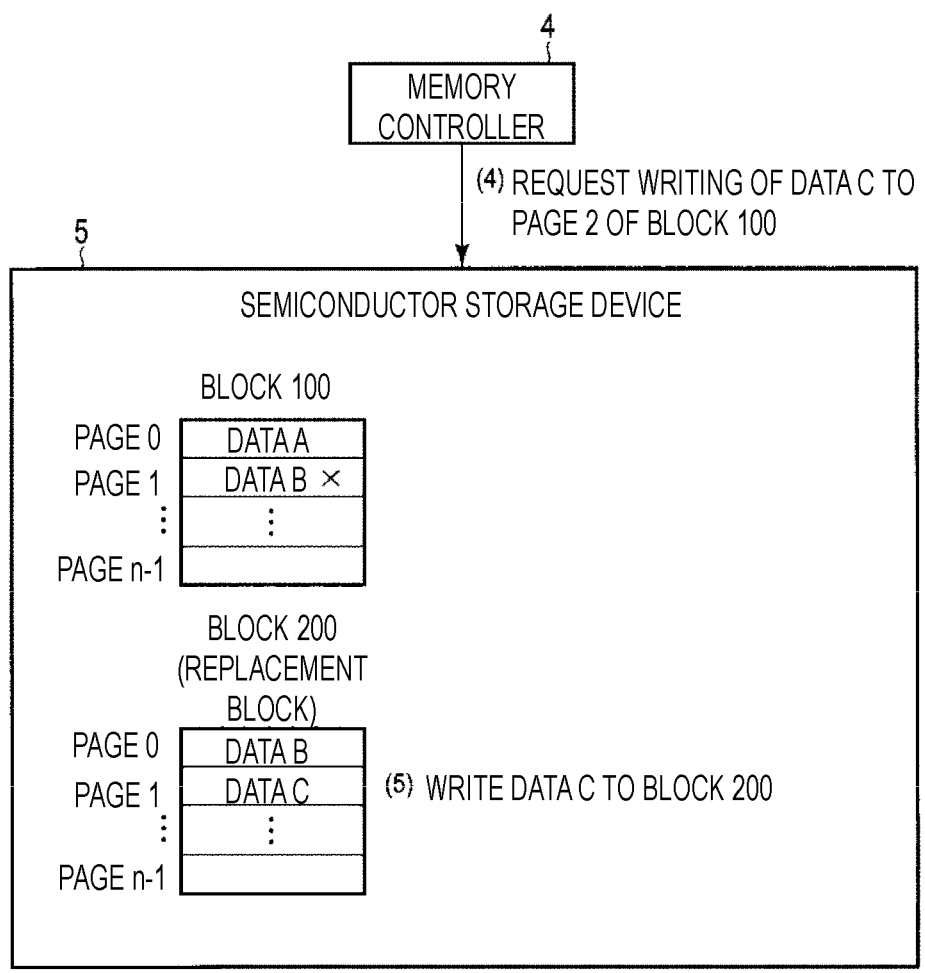
FIG. 5 is a diagram illustrating an example in which data is further written to a replacement destination block of FIG. 3.

As illustrated in FIG. 5, after the data B is successfully written to page 0 of the block 200, when the memory controller 4 requests writing of data C to a page after page 1 in the block 100 (here, page 2), the replacement controller 34 controls the data C to be written to the block 200. That is, the data requested to be written after page 1 in the block 100 is written to the block 200.

Figure 6:
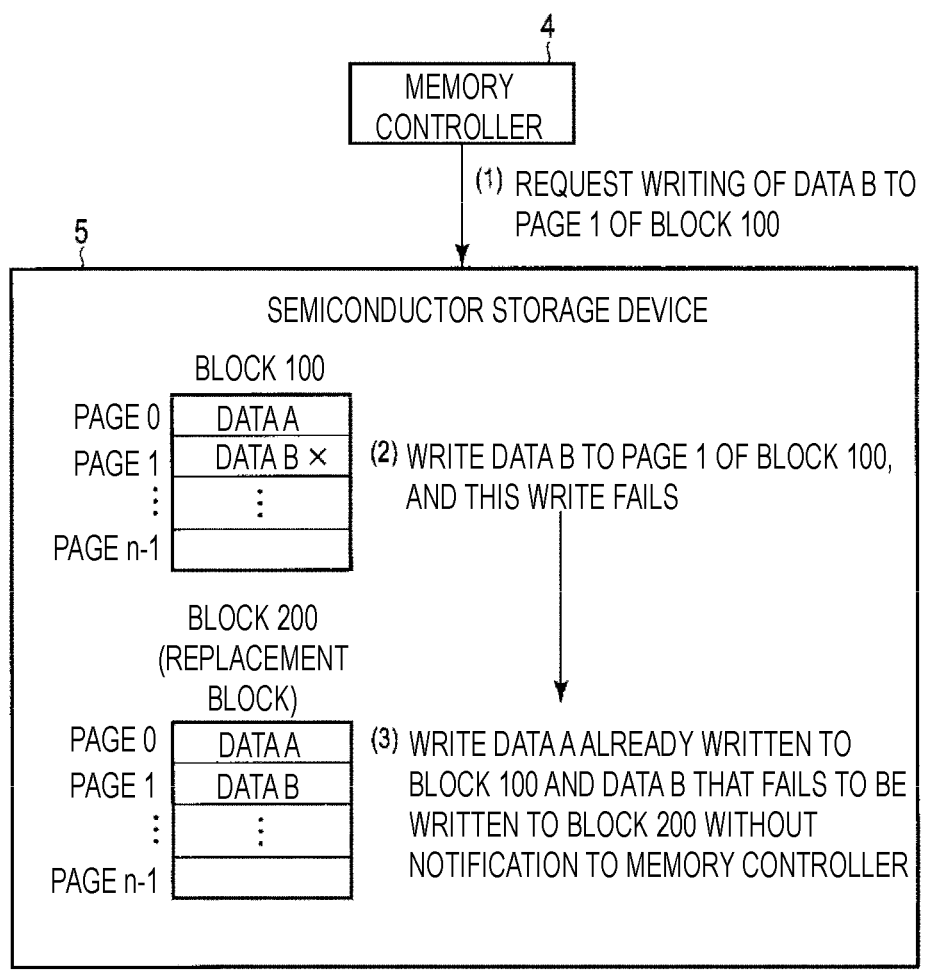
FIG. 6 is a diagram illustrating a third example in which a block is replaced at the time of write failure by the memory system according to the first embodiment.

In addition, as illustrated in FIG. 6, the replacement controller 34 may cause not only the data B but also the data already written in the block 100 at the time when the writing of the data B to page 1 of the block 100 fails (here, the data A) to be also written in the block 200.

Therefore, when the writing of the data B to page 1 of the block 100 fails, the replacement controller 34 may select any one of (a) writing the data A already written in the block 100 and the data B that failed to be written to the block 200, (b) writing the data B to first page 0 of the block 200, and (c) writing the data B to page 1 in the block 200 that has the same page number as page 1 where the write failed.

Figure 7:
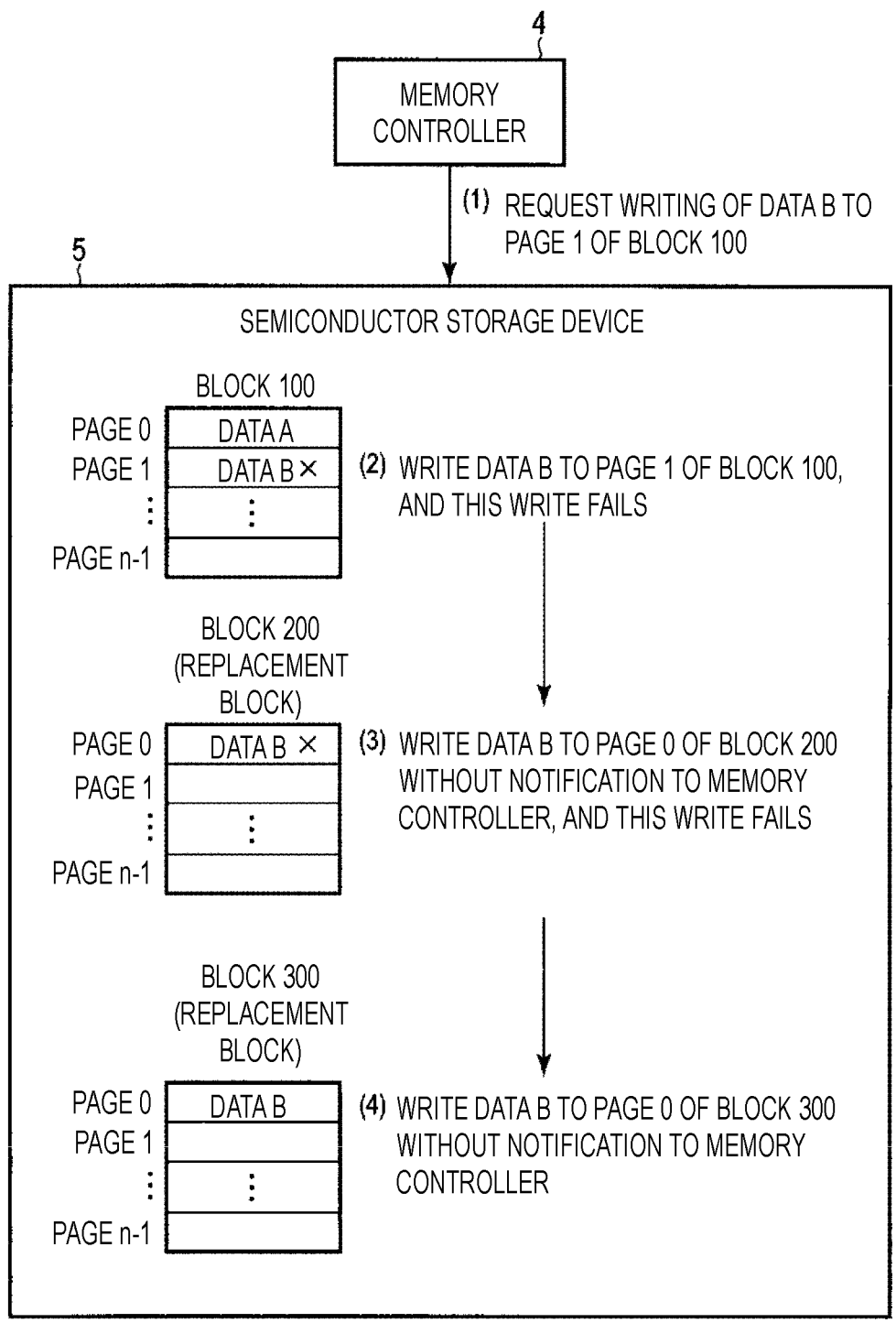
FIG. 7 is a diagram illustrating a fourth example in which a block is replaced at the time of write failure by the memory system according to the first embodiment.
Figure 8:
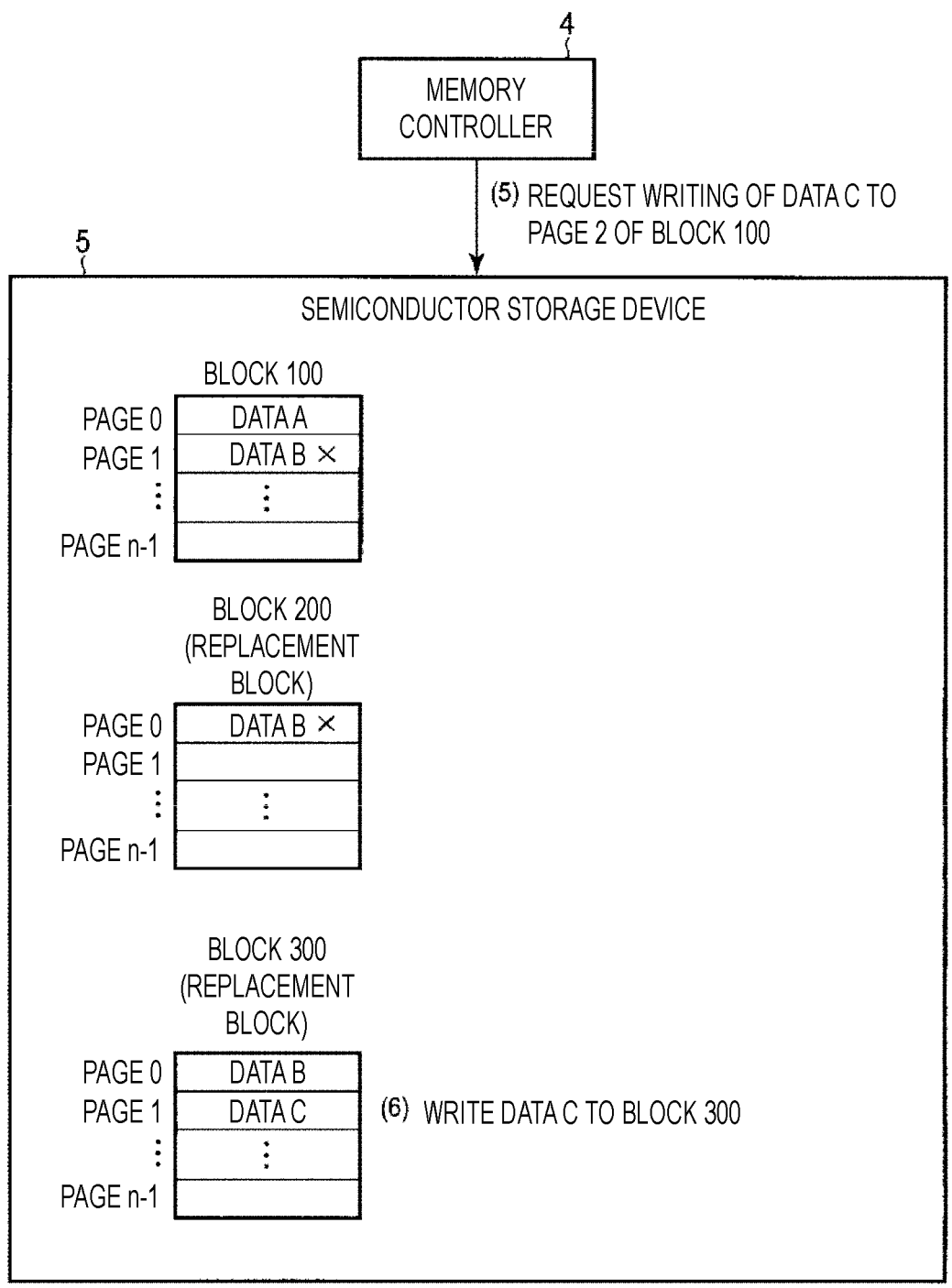
FIG. 8 is a diagram illustrating an example in which data is further written to a replacement destination block of FIG. 7.

In addition, as illustrated in FIG. 7, when the writing of the data B to the block 200 fails, the replacement controller 34 controls the data B to be written to another block 300 in the memory cell array 31 without notifying the memory controller 4 of the failure of the writing. As illustrated in FIG. 8, after the data B is successfully written to the block 300, when the memory controller 4 requests writing of the data C to a page after page 1 in the block 100 (here, page 2), the replacement controller 34 causes the data C to be written to the block 300. That is, the data requested to be written after page 1 in the block 100 is written to the block 300.

In addition, when the writing of the data B to the block 300 fails, the replacement controller 34 causes the data B to be written to another block in the memory cell array 31 (e.g., block 400) without notifying the memory controller 4 of the failure of the writing. When the writing of the data B to the block 400 fails, the replacement controller 34 causes the data B to be written to another block in the memory cell array 31 (e.g., block 500) without notifying the memory controller 4 of the failure of the writing. In this way, when the writing of the data B to a certain block fails, the replacement controller 34 repeats an operation to cause the writing of the data B by securing another block until the writing succeeds.

The semiconductor storage device 5 of the present embodiment may write the data to the replacement block by the operation of the replacement controller 34 as described above without notifying the memory controller 4 of the failure of the writing even when the writing of data to a certain block fails.

As described above, the semiconductor storage device 5 of the present embodiment is configured to not notify the memory controller 4 of the failure of writing. In the related art, a semiconductor storage device may be configured to notify the memory controller of the failure of writing. When the failure of writing is notified by the semiconductor storage device, the memory controller requests the semiconductor storage device to write, to a separate block, the data that fails to be written and the data that is destroyed collaterally therewith.

In a semiconductor storage device, data may be written to one memory cell through plural program stages in a program operation for writing. For example, when a semiconductor storage device includes a multilevel cell (MLC) flash memory capable of storing 2 bits of data per memory cell, one memory cell connected to a certain word line is written in a divided manner in two pages of data writing, that is, lower page data writing and upper page data writing. In such a memory cell, the lower page data that has been already written may be destroyed by the failure of writing the upper page data. In this way, data that has been written on a page separate from the failed page and has been destroyed, is referred to as involved and destroyed data.

Further, the data in the memory cell connected to the adjacent word line may be destroyed by physically short-circuiting with the adjacent word line at the time of writing. The data destroyed in this manner is also referred to as the involved and destroyed data.

Referring to FIGS. 9 to 14, descriptions will be made on an example of a write processing using the memory controller and the semiconductor storage device that notifies the memory controller of the failure when the write fails. In the following, a set of plural blocks is referred to as a sector.

Here, an example is described in which data is written to a sector 41. Generally, a sector is used as the write destination of data. Hereinafter, for the sake of clarity, a case has been described as an example in which the sector 41 includes four blocks 100, 200, 300, and 400, and each of these blocks 100, 200, 300, and 400 includes four pages from page 0 to page 3.

A physical address is allocated to plural pages in the sector. The sector 41 illustrated in FIG. 9 includes 16 pages. Physical addresses 0 to 15 are allocated to these pages in order of increasing page number and of increasing block number. That is, physical address 0 is allocated to page 0 of the block 100, physical address 1 is allocated to page 0 of the block 200, physical address 2 is allocated to page 0 of the block 300, physical address 3 is allocated to page 0 of the block 400, and physical address 4 is allocated to page 1 of the block 100, physical address 5 is allocated to page 1 of the block 200, . . . physical address 14 is allocated to page 3 of the block 300, and physical address 15 is allocated to page 3 of the block 400. Further, the number of blocks included in the sector 41 and the number of pages included in each block may be set as needed according to the characteristics and uses of a memory system.

Unlike the semiconductor storage device 5 of the present embodiment, the semiconductor storage device in this example does not have a replacement function of writing data in a separate block without notifying the memory controller of failure at the time of write failure. The memory controller is configured to secure a new write destination sector in accordance with the notification of the writing failure from the semiconductor storage device and to write the data in which the writing has failed and the subsequent data to the sector.

When the host 2 requests writing of data to a certain logical address, the memory controller determines to which physical address the data is written, and requests that the semiconductor storage device write data to the physical address. Then, the memory controller maps the logical address to the physical address. This mapping is written as an entry in a logical-to-physical address conversion table 21-1. After requesting writing to the semiconductor storage device, the memory controller maps the logical address to the physical address before the writing by the semiconductor storage device is completed, and then uses the entry indicating the mapping to update the logical-to-physical address conversion table 21-1.

In the sector 41, the data is written in order from the page having the smallest allocated physical address. That is, in the sector 41, data is written to one page in each block in the order of block 100, block 200, block 300, and block 400. In each block, data is written in order from front page 0. Therefore, in the sector 41, data is caused to be written in order of page 0 of the block 100, page 0 of the block 200, page 0 of the block 300, page 0 of the block 400, page 1 of the block 100, page 1 of the block 200, . . . page 3 of the block 300, and page 3 of the block 400. Additional writing in the sector is implemented by writing in this order.

Figures 9, 10:
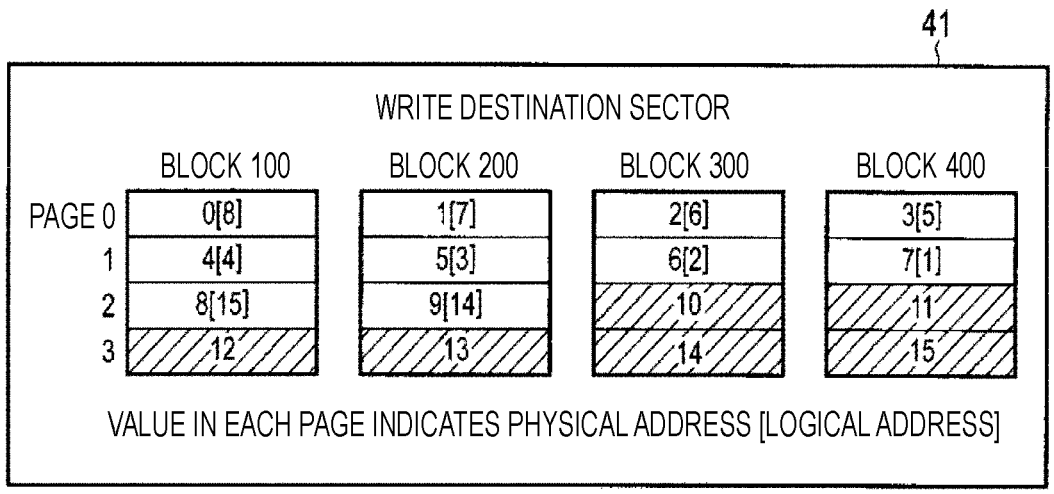
FIG. 9 is a diagram illustrating an example in which data is written to a sector.
FIG. 10 is a diagram illustrating an example of a logical-to-physical address conversion table corresponding to the write of FIG. 9.

In FIG. 9, the physical address and logical address corresponding to the page are indicated in each area representing the page in the format of a "physical address (logical address)." Further, among these areas, the area indicated by hatching indicates that data has not yet been written on the corresponding page, and only the physical address is indicated. Thus, in the example illustrated in FIG. 9, data is written to the pages of physical addresses 0 to 9, and each of logical addresses 8, 7, 6, 5, 4, 3, 2, 1, 15, and 14 is respectively mapped to each of physical addresses 0 to 9. Also, data has not yet been written to the pages of physical addresses 10 to 15, and none of physical addresses 10 to 15 are mapped to any logical addresses.

FIG. 10 illustrates the logical-to-physical address conversion table 21-1 corresponding to the sector 41. The logical-to-physical address conversion table 21-1 indicates that each of physical addresses 7, 6, 5, 4, 3, 2, 1, 0, 9, and 8 is respectively mapped to each of logical addresses 1, 2, 3, 4, 5, 6, 7, 8, 14, and 15, and none of the physical addresses are mapped to logical addresses 0 and 9 to 13.

As illustrated in FIG. 11, when the host 2 further requests writing of data to the logical address 13, the memory controller determines to write the data to physical address 10. The memory controller requests that the semiconductor storage device write data to physical address 10. After requesting writing to the semiconductor storage device, the memory controller adds an entry indicating the mapping between logical address 13 and physical address 10 to the logical-to-physical address conversion table 21-1, before the writing by the semiconductor storage device is completed, as illustrated in FIG. 12.

Here, referring to FIGS. 13 and 14, descriptions will be made on a case where the writing of data to physical address 10 (corresponding to logical address 13) by the semiconductor storage device fails.

As illustrated in FIG. 13, when the writing of data to physical address 10 on page 2 in the block 300 fails, the semiconductor storage device notifies the memory controller of the failure. The memory controller secures a new write destination sector 42 in response to the notification. Like the sector 41, the sector 42 includes four blocks 500, 600, 700, and 800, and each of these blocks 500, 600, 700, and 800 includes four pages from page 0 to page 3.

The sector 42 includes 16 pages. Physical addresses 16 to 31 are allocated to these 16 pages in the order of increasing page numbers and increasing block numbers. That is, in the sector 42, physical address 16 is allocated to page 0 of the block 500, physical address 17 is allocated to page 0 of the block 600, physical address 18 is allocated to page 0 of the block 700, physical address 19 is allocated to page 0 of the block 800, physical address 20 is allocated to page 1 of the block 500, physical address 21 is allocated to page 1 of the block 600, physical address 30 is allocated to page 3 of the block 700, and physical address 31 is allocated to page 3 of the block 800.

The memory controller determines to write, to physical address 16, data that should otherwise be written to logical address 13 where the write failed. The memory controller requests that the semiconductor storage device write the data to physical address 16. The memory controller then updates the logical-to-physical address conversion table 21-1 by adding an entry that indicates the mapping between logical address 13 and physical address 16, as illustrated in FIG. 14.

In addition, when writing of further data is requested from the host 2, the data is written to the pages of physical addresses 17 to 31 in the write sector 42 in order. Therefore, a new sector 42 is secured in response to a write failure to physical address 10, and no data is written to physical addresses 11 to 15 following physical address 10 in the original sector 41 where the write failed.

Here, the block 300 is assumed to have a characteristic that data is not able to be written to page 2 where the write failed (physical address 10) and to page 3 after page 2 (physical address 14). Therefore, data is not able to be written to the sector 41 in the order of the physical address. In addition, the data that would otherwise be added to the sector 41 if a write failure does not occur is written to another sector 42. As illustrated in FIG. 13, physical addresses 16 to 31 allocated to the sector 42 are not continuous with physical addresses 1 to 9 of the data written to the sector 41. In this way, when data is not written to the continuous physical address, the degree to which valid data is fragmented increases, and the frequency of generation of GC accompanied thereby increases, thereby possibly degrading access performance for the semiconductor storage device.

In such a configuration, because of the possibility of the failure of writing, the memory controller needs to keep not only the data to be written, but also data in a range that may be destroyed at the time of write failure in a write buffer or the like. In addition, the memory controller needs to manage the block as a defective block so that the block where writing has failed is not reused.

In response to a write request to physical address 10 in the sector 41, the memory controller updates the logical-to-physical address conversion table 21-1, and in response to a write request to physical address 16 in the sector 42 due to occurrence of a write failure, the memory controller further updates the logical-to-physical address conversion table 21-1. As a result, the logical-to-physical address conversion table 21-1 may have an enormous size. In this case, the memory controller needs time to update the logical-to-physical address conversion table 21-1, and the efficiency of the processing for writing to the semiconductor storage device is reduced.

The operation of such a memory controller to cope with write failures in the semiconductor storage device is a substantial burden on the memory system.

In addition, although no write failures occur in blocks 100, 200, and 400, data may not be written to page 3 of the block 100, page 3 of the block 200, and pages 2 and 3 of the block 400. That is, the available storage capacity of these pages is not used.

Therefore, in the present embodiment, the semiconductor storage device 5 is configured to write the data to another block without notifying the memory controller 4 of the failure when the writing of data to a certain page of a certain block fails. Even when the writing has failed, the semiconductor storage device 5 may write data to the memory cell array 31 by repeating the write operation therein until the writing succeeds without notifying the memory controller 4.

Referring to FIGS. 15 to 21, descriptions will be made on an example of the write processing by the memory controller 4 and the semiconductor storage device 5 of the present embodiment. Here, an example in which data is written to the sector 45 is illustrated. Hereinafter, for the sake of clarity, a case has been described as an example in which the sector 45 includes four blocks 100, 200, 300, and 400, and each of these blocks 100, 200, 300, and 400 includes four pages from page 0 to page 3. As described above, the number of blocks in the sector 45 and the number of pages in each block may be set as needed in accordance with the characteristics and uses of the memory system 1 and the like. The order of pages in which data is written to the sector 45 and the allocation of physical addresses are the same as those of the sector 41 described above with reference to FIG. 9.

Figures 15, 16:
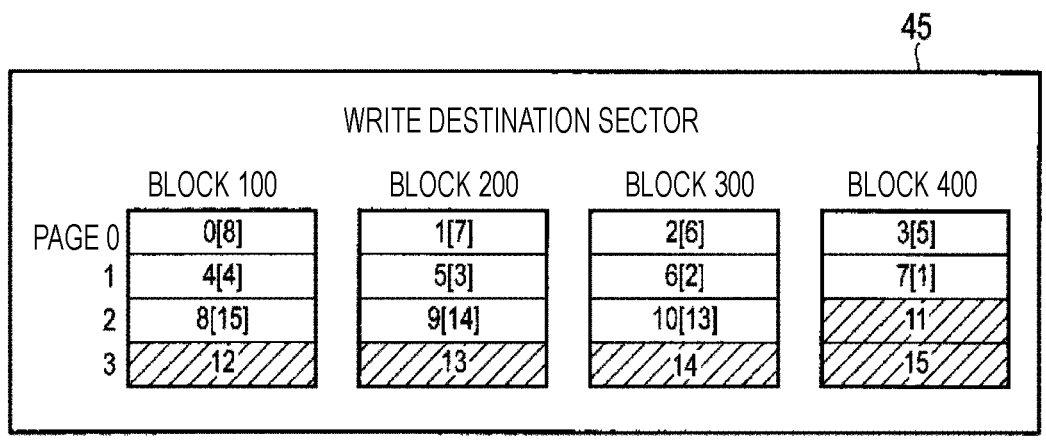
FIG. 15 is a diagram illustrating an example in which data is written to a sector in a semiconductor storage device provided in the memory system according to the first embodiment.
FIG. 16 is a diagram illustrating an example of a logical-to-physical address conversion table corresponding to the write of FIG. 15.

FIG. 15 illustrates the sector 45 at the time when data writing to the page of physical address 10 is requested after data writing to pages of physical addresses 0 to 9 is completed. Each of logical addresses 8, 7, 6, 5, 4, 3, 2, 1, 15, 14, and 13 is respectively mapped to each of physical addresses 0 to 10.

FIG. 16 illustrates the logical-to-physical address conversion table 21 corresponding to the sector 45. The logical-to-physical address conversion table 21 indicates that each of physical addresses 7, 6, 5, 4, 3, 2, 1, 0, 9, and 8 is respectively mapped to each of logical addresses 1, 2, 3, 4, 5, 6, 7, 8, 14, and 15. Further, an entry indicating the mapping between logical address 13 and physical address 10 is added to the logical-to-physical address conversion table 21 after data writing to the page of physical address 10 is requested.

Figure 17:
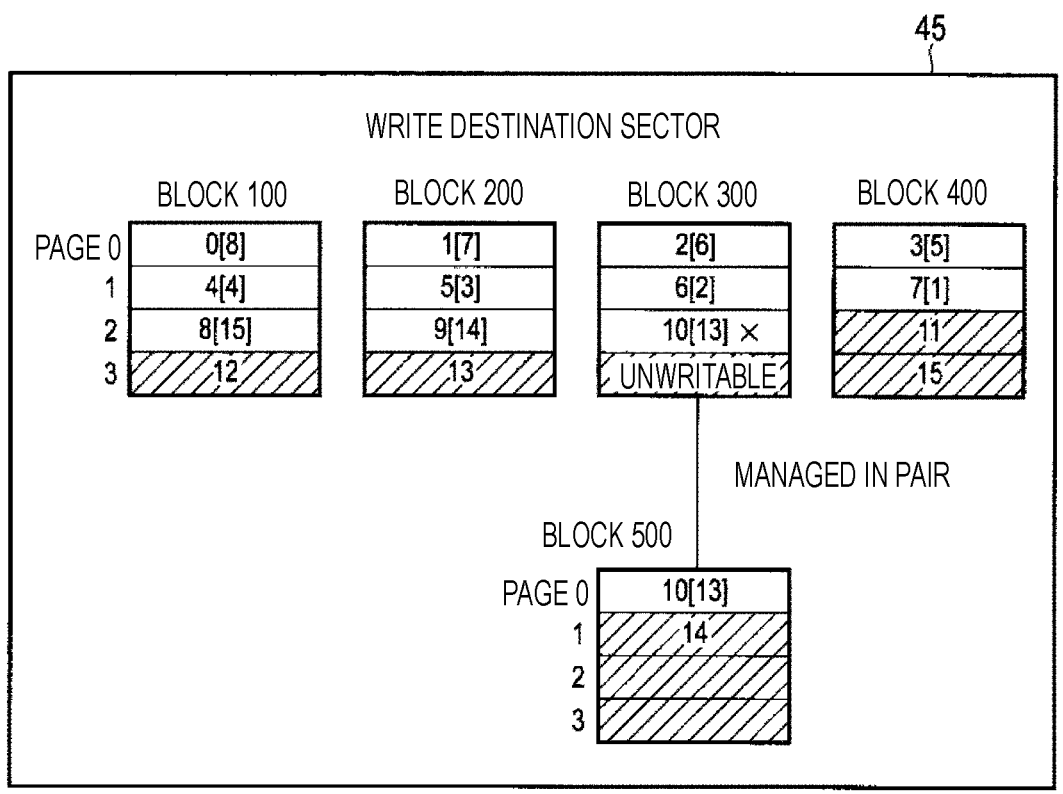
FIG. 17 is a diagram illustrating an example in which data is written to a replacement block when a write failure occurs in the write of FIG. 15.

FIG. 17 illustrates the sector 45 when a write failure occurs to the page of physical address 10, that is, page 2 of the block 300. Here, the block 300 is assumed to have a characteristic that data may not be written to page 2 where the write failed and page 3 after page 2. Therefore, the semiconductor storage device 5 allocates a block 500 that replaces the data write destination in response to the occurrence of the write failure. For the block 500, one block selected from the free block group that does not include valid data is used after erase processing.

The semiconductor storage device 5 writes data (e.g., data that failed to be written to page 2 of the block 300), for example, to page 0 of the block 500. The data to be written is, for example, data stored in the input/output buffer 32. Further, when a method of writing data while generating parity data for restoring written data is used at the time of writing, data that is restored using parity data may be used for data written in the replacement destination block 500. In this case, since the data for the retry at the time of write failure is not stored in the input/output buffer 32, the amount of data stored in the input/output buffer 32 may be reduced.

In addition, the semiconductor storage device 5 manages the block 300 where the write failed and the replacement destination block 500 as a pair. Further, the logical-to-physical address conversion table 21 may include an entry that indicates the mapping between physical address 10 and logical address 13, as illustrated in FIG. 16, and does not need to be updated.

Figures 18, 19:
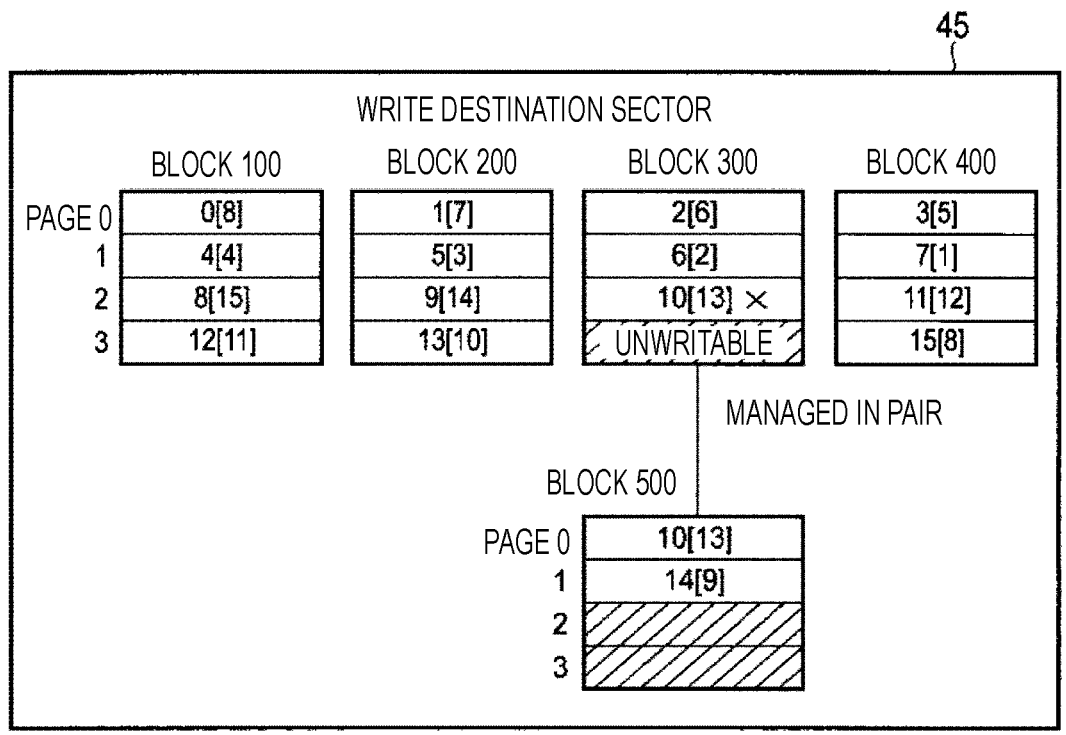
FIG. 18 is a diagram illustrating an example in which data is further written to the sector of FIG. 15.
FIG. 19 is a diagram illustrating an example of a logical-to-physical address conversion table corresponding to the write of FIG. 18.

Subsequently, as illustrated in FIG. 18, when the host 2 requests writing of data to each of logical addresses 12, 11, and 10, the memory controller 4 determines to write the data to each of physical addresses 11, 12, and 13. Further, the request for writing may be a request generated by the internal operation of the memory system 1, such as the processing of garbage collection, without being limited to the request by the host 2. The memory controller 4 requests that the semiconductor storage device 5 write data to each of physical addresses 11, 12, and 13. In response to this request, the semiconductor storage device 5 writes data to page 2 of the block 400, page 3 of the block 100, and page 3 of the block 200, respectively.

Further, when the host 2 requests writing of data to logical address 9, the memory controller 4 then determines to write the data to physical address 14. The memory controller 4 requests that the semiconductor storage device 5 write the data to physical address 14. The semiconductor storage device 5 writes the data to page 1 of the replacement block 500 because the data may not be written to page 3 of the block 300 due to the write failure to page 2 of the block 300. Page 1 is a page following page 0 of the block 500 where data which failed to be written is written.

In addition, when the host 2 requests writing of data to logical address 8, the memory controller 4 determines to write the data to physical address 15. The memory controller 4 requests that the semiconductor storage device 5 write the data to physical address 15. The semiconductor storage device 5 writes the data to page 3 of the block 500.

In this way, when an error occurs in writing to page 2 of the block 300, data that should otherwise be written to page 2 is rewritten to the replacement block 500 internally in the semiconductor storage device 5. This allows the subsequent data to be written to the blocks 100, 200, and 400 and the replacement block 500, excluding the block 300 where the write failed.

FIG. 19 illustrates the logical-to-physical address conversion table 21 corresponding to the sector 45. Compared to the logical-to-physical address conversion table 21 illustrated in FIG. 16, an entry indicating that each of physical addresses 15 to 11 is mapped each of logical addresses 8 to 12, is added to the logical-to-physical address conversion table 21.

In addition, as illustrated in FIG. 20A, in the semiconductor storage device 5, the block 300 where the write failed and the replacement block 500 are managed in pairs. As described above, the data that should otherwise be written to page 2 of the block 300 is written to page 0 of the replacement block 500 because the writing to page 2 of the block 300 has failed. Also, data to be written to page 3 of the block 300 is written to page 1 of the replacement block 500.

At least a portion of the page of the block 300 is replaced with a page of the block 500 by the write failure, and the fact that the block 300 and the block 500 are managed as a pair is unknown to outside of the semiconductor storage device 5 such as the memory controller 4. That is, as illustrated in FIG. 20B, when a replacement due to the write failure occurs, it is recognized from the outside (e.g., the memory controller 4) that data is written to physical addresses 2, 6, 10, and 14, which are pages 0 to 3 of the block 300. Therefore, the memory controller 4 may access the semiconductor storage device 5 without considering any replacement due to the write failure.

FIG. 21 illustrates an example of a replacement table 38 that manages the block 300 where a write failure occurs and the block 500 for the replacement. Each entry in the replacement table 38 includes a write failure location and a replacement location. As described above, the write failure position indicates the physical storage location where the write failed, and represented by, for example, the block number and the page number. The replacement position indicates the physical storage location where the write failure location is replaced and represented by, for example, the block number.

In the replacement table 38 illustrated in FIG. 21, the entry with the write failure position of "300-2" and the replacement position of "500" indicates that page 2 of the block 300 is replaced with the block 500. Based on the entry, the semiconductor storage device 5 may recognize that the data that should otherwise be written to page 2 of the block 300 is written to page 0 of the block 500, and may recognize that the data that should otherwise be written to the page after page 2 of the block 300 may be continuously written in order starting from page 1 of the block 500.

With this configuration, when the writing of data to page 2 of the block 300 in the sector 45 fails, since the pages after page 2 where the write fails (i.e., page 2 and page 3) are replaced with the pages in another block 500 (e.g., page 0 and page 1), data may be continuously written in the sector 45.

Further, when the memory controller 4 requests reading of data from a certain page of a certain block in the semiconductor storage device 5, the semiconductor storage device 5 uses the replacement table 38 to determine whether the page is a replacement page. The semiconductor storage device 5 determines, for example, whether a page in a block for which data is requested to be read is the page after the page in the block that is indicated as the write failure position in each entry of the replacement table 38 (i.e., the page after the page where the write failed). When neither of the entries is applicable, the semiconductor storage device 5 reads the data from the page in the block for which reading is requested.

On the other hand, when there is a corresponding entry, the semiconductor storage device 5 specifies the page where the page to be read is replaced in the block indicated as the replacement position of the entry, and reads data from the page. The semiconductor storage device 5 may specify the replaced page based on a relative relationship between the page indicated as the write failure position and the page to be read.

For example, in the example illustrated in FIG. 20A, when the memory controller 4 requests reading of data from page 3 of the block 300, the semiconductor storage device 5 uses the replacement table 38 illustrated in FIG. 21 to specify the page in the block 500 where page 3 in the block 300 to be read has been replaced. One entry in the replacement table 38 indicates that page 2 of the block 300 indicated as the write failure position is replaced with the front page of the block 500 indicated as the replacement position. Page 3 of the block 300 to be read is the page which is one after page 2 of the block 300 indicated as the write failure position. Therefore, page 1, which is one after front page 0 of the replacement block 500, is specified as a page to which page 3 of the block 300 to be read is replaced.

As described above, by using the replacement table 38, the data written to the replacement block by failing to write to a certain block may be appropriately read by failing to write to a certain block.

Subsequently, referring to FIGS. 22 and 23, an example of the write processing is illustrated in a case where a further write failure occurs in the replacement block.

Figures 22, 23:
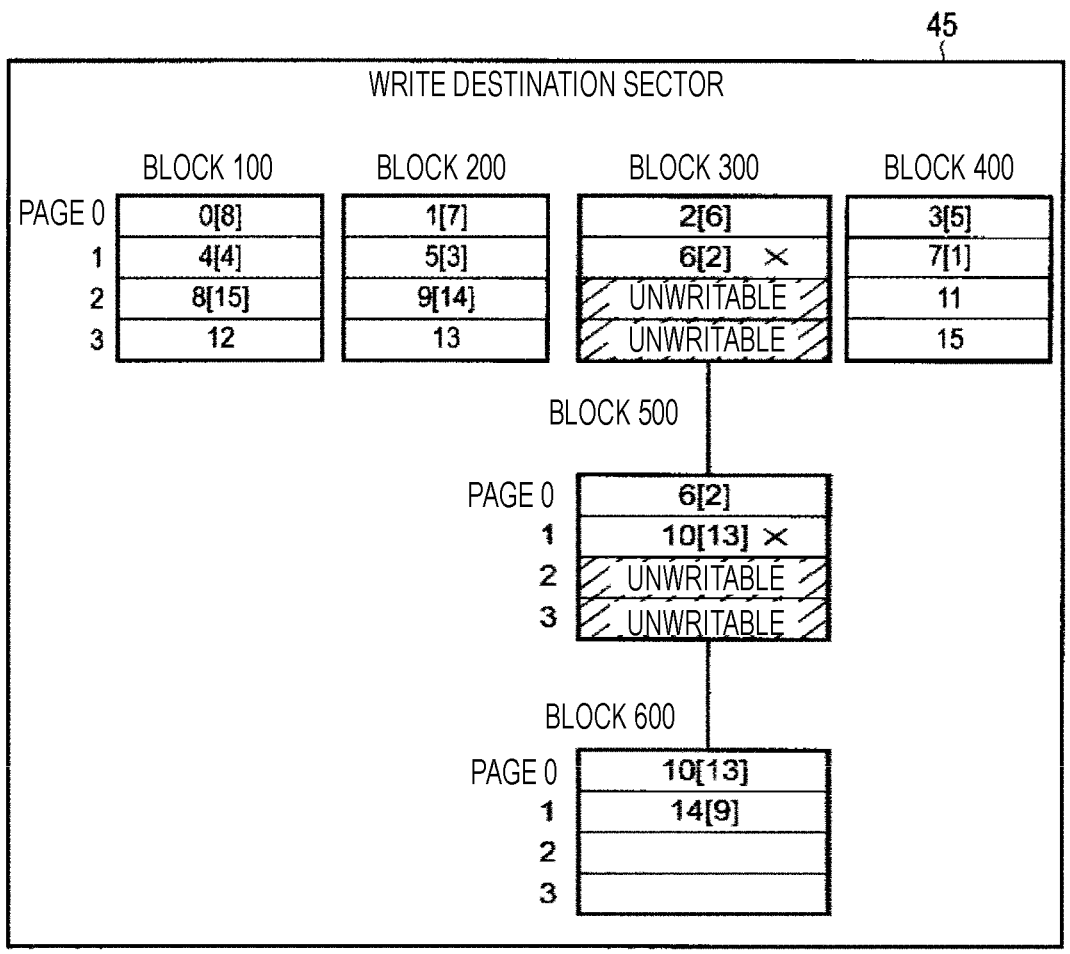
FIG. 22 is a diagram illustrating an example in which data is written to another replacement block when a write failure occurs in the replacement block by the semiconductor storage device of FIG. 15.
FIG. 23 is a diagram illustrating an example of a replacement table corresponding to the replacement of FIG. 22.

In the sector 45 illustrated in FIG. 22, after the data writing to the pages of physical addresses 0 to 5 is completed, the data fails to be written to the page of physical address 6, that is, page 1 of the block 300, and the data is written to page 0 of the block 500 for replacement. The semiconductor storage device 5 manages the blocks 300 and 500 in pairs. More specifically, as illustrated in FIG. 23, an entry indicating that the write failure position is page 1 of the block 300 and the replacement position is the block 500, is added to the replacement table 38.

After the writing to physical addresses 6 to 9 is completed in the sector 45, the data writing to the page of physical address 10, that is, page 1 of the block 500, also fails, and the data is written to page 0 of the block 600 as a new replacement. The semiconductor storage device 5 manages the blocks 500 and 600 in pairs. More specifically, as illustrated in FIG. 23, an entry indicating that the write failure position is page 1 of the block 500 and the replacement position is the block 600, is added to the replacement table 38.

As described above, the semiconductor storage device 5 of the present embodiment is configured to write data in another replacement block 600 and to describe the replacement relationship in the replacement table 38 when a write failure occurs in the replacement block 500. As a result, it is possible to easily cope with even plural write failures for physical addresses 2, 6, 10, and 14 corresponding to a certain block 300.

Therefore, it is possible to provide the memory controller 4 with a simple interface that may request an additional write without considering the write failure in the semiconductor storage device 5. The memory controller 4 does not perform error processing in response to a write failure, and data for the error processing is not transferred between the memory controller 4 and the semiconductor storage device 5. Thus, the processing for coping with the write failure can be simplified and accelerated. Further, in the semiconductor storage device 5, defective blocks where the write has failed may be recognized using the replacement table 38, so that the defective block management in the memory controller 4 becomes unnecessary.

The example described above shows an algorithm to replace a block by writing the data, which should otherwise be written to a block after the page where the write failed, to another block in order from the beginning of another block. The replacement of the block where the write failure occurs is not limited to the algorithm, and various algorithms as described below may be used.

Figure 24:
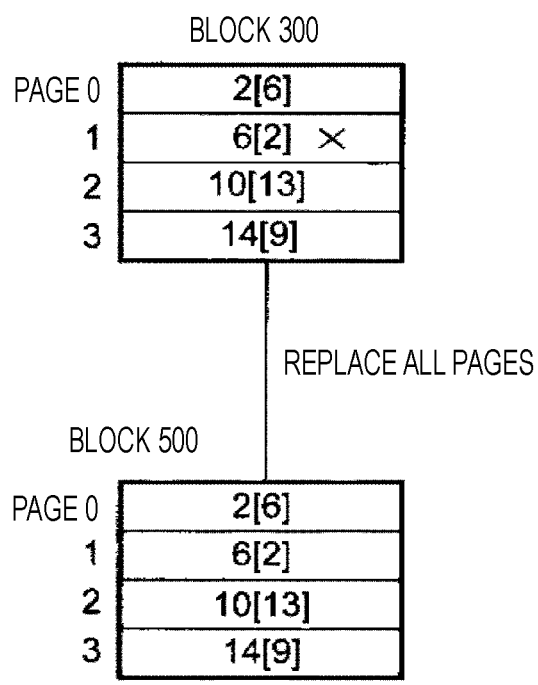
FIG. 24 is a diagram illustrating a first example of replacement by the semiconductor storage device of FIG. 15.
Figure 25:
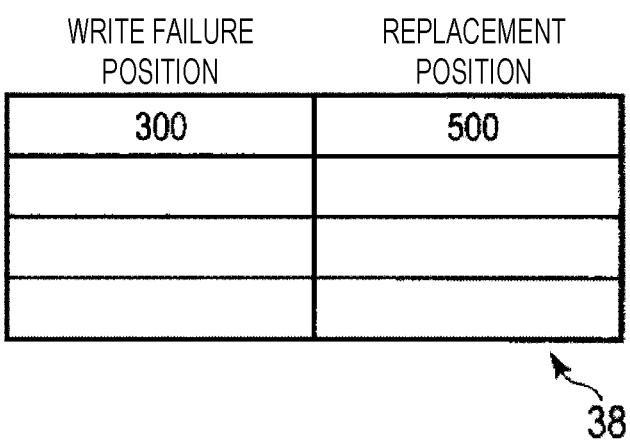
FIG. 25 is a diagram illustrating an example of a replacement table corresponding to the replacement of FIG. 24.

FIGS. 24 and 25 illustrate an example in which the entire block is replaced. In this example, when the data writing to page 1 of the block 300 fails, all data to be written to the block 300 is written to the replacement block 500. In this case, even when the block 300 has a characteristic that data may be written to pages 2 and 3 after page 1 where the write failed, all the data to be written to the block 300 is written to the replacement block 500. Further, the data already written to page 0 of the block 300 is read from page 0 and written to page 0 of the replacement block 500.

As illustrated in FIG. 25, an entry indicating that the write failure position is the block 300 and the replacement position is the block 500, is added to the replacement table 38. Since the entire block is replaced, only the block number needs to be managed as the entry, and the page number does not need to be managed. Therefore, the size of the replacement table 38 may be reduced.

Figure 26:
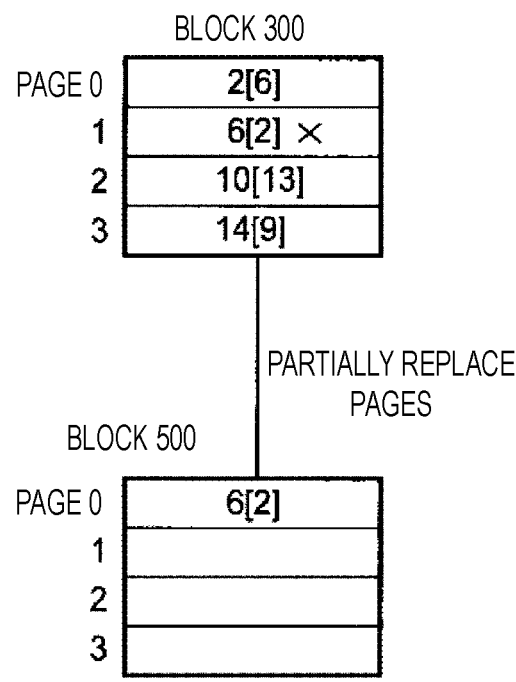
FIG. 26 is a diagram illustrating a second example of replacement by the semiconductor storage device of FIG. 15.
Figure 27:
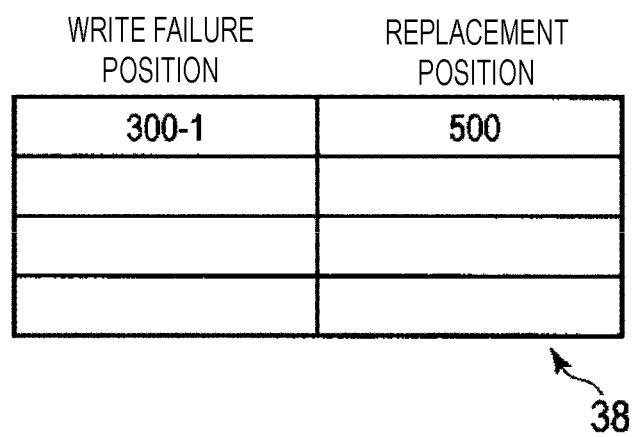
FIG. 27 is a diagram illustrating an example of a replacement table corresponding to the replacement of FIG. 26.

FIGS. 26 and 27 illustrate an example in which a page in a block is partially replaced. In this example, each block is assumed to have a characteristic that data is not able to be written to a page where the write failed, but data is able to be written to a page after the page where the write failed.

When the writing of data to page 1 of the block 300 fails, only that data is written to the replacement block 500. Also, the data to be written to subsequent pages 2 and 3 in the block 300 is written to those pages 2 and 3, and is not written to the replacement block 500.

As illustrated in FIG. 27, an entry indicating that the write failure position is page 1 of the block 300 and the replacement position is the block 500, is added to the replacement table 38.

Further, the data that has failed to be written may be written to front page 0 in the replacement block 500 or to any other page. In that case, in the corresponding entry in the replacement table 38, the block number and the page number are indicated as a replacement position.

Further, a page in which data is not written in the replacement block 500 may be used to replace another block other than the block 300.

Figures 28, 29:
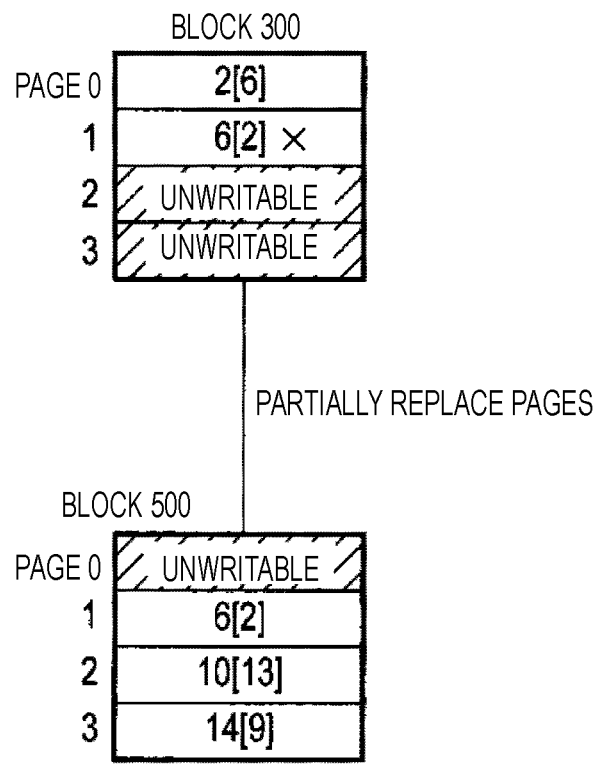
FIG. 28 is a diagram illustrating a third example of replacement by the semiconductor storage device of FIG. 15.
FIG. 29 is a diagram illustrating an example of a replacement table corresponding to the replacement of FIG. 28.

FIGS. 28 and 29 illustrate another example in which the pages in the block are partially replaced. In this example, each block is assumed to have a characteristic that data is not able to be written to the page after the page where the write failed.

When the data writing to page 1 of the block 300 fails, the data that should otherwise be written to page 1 of the block 300 and the subsequent pages 2 and 3 of the block 300, is written to the corresponding pages 1 to 3 in the replacement block 500. That is, page 0 in the replacement block 500 corresponding to page 0 where data writing has been completed in the original block 300 is controlled so that data is not written thereto.

As illustrated in FIG. 29, an entry indicating that the write failure position is page 1 of the block 300 and the replacement position is page 1 of the block 500, is added to the replacement table 38. Further, in the replacement block 500, the data is written to the page with the same page number as the page of the write failure position (here, page 1), so that the page number indicated in the replacement position may be omitted. That is, an entry indicating that the write failure location is page 1 of the block 300 and the replacement location is the block 500, may be added to the replacement table 38.

In the semiconductor storage device 5, various block replacement algorithms as described above are used, and the optimum algorithm may be selected according to the situation. Such a selection can prevent the degradation in performance of the memory system 1 due to the replacement of blocks. In addition, when the memory cell array 31 of the semiconductor storage device 5 has a characteristic that data is not able to be written after the page where the write failed, or when the memory cell array 31 of the semiconductor storage device 5 has a characteristic that data is able to be written to the page after the page where the write failed, the optimal block replacement algorithm may be selected according to the characteristics.

Figure 30:
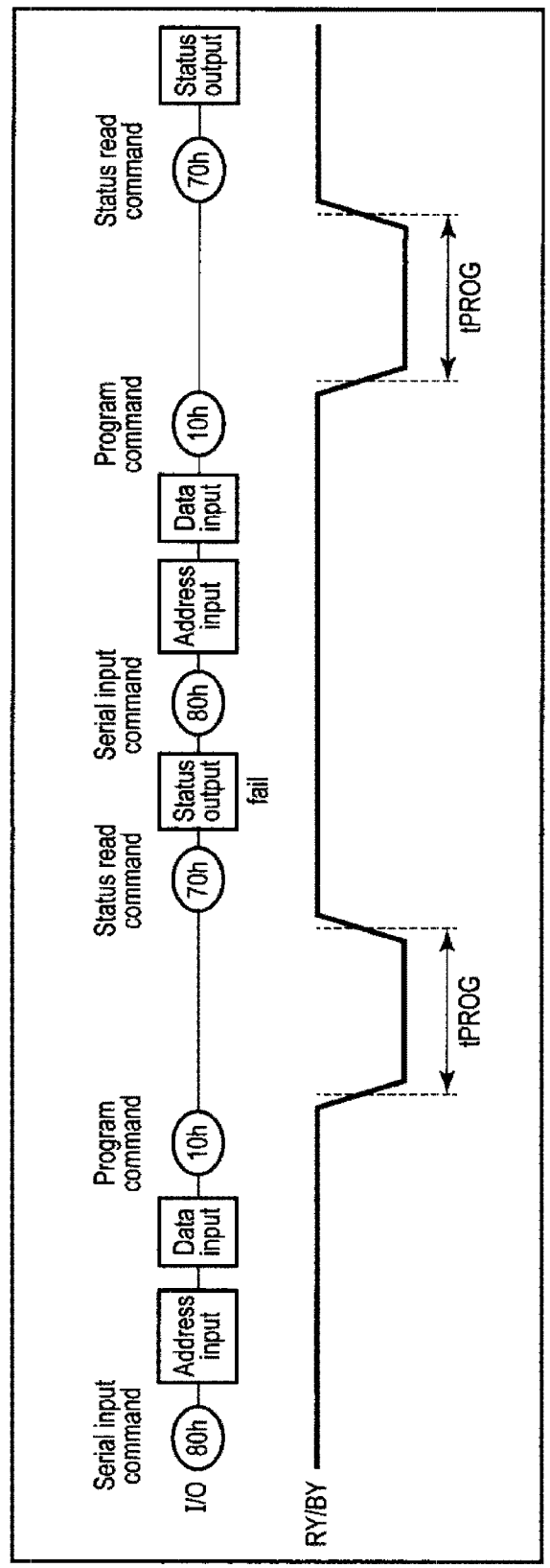
FIG. 30 is a timing chart illustrating the sequence of a write operation executed by the memory controller when a write failure is notified by the semiconductor storage device.
Figure 31:
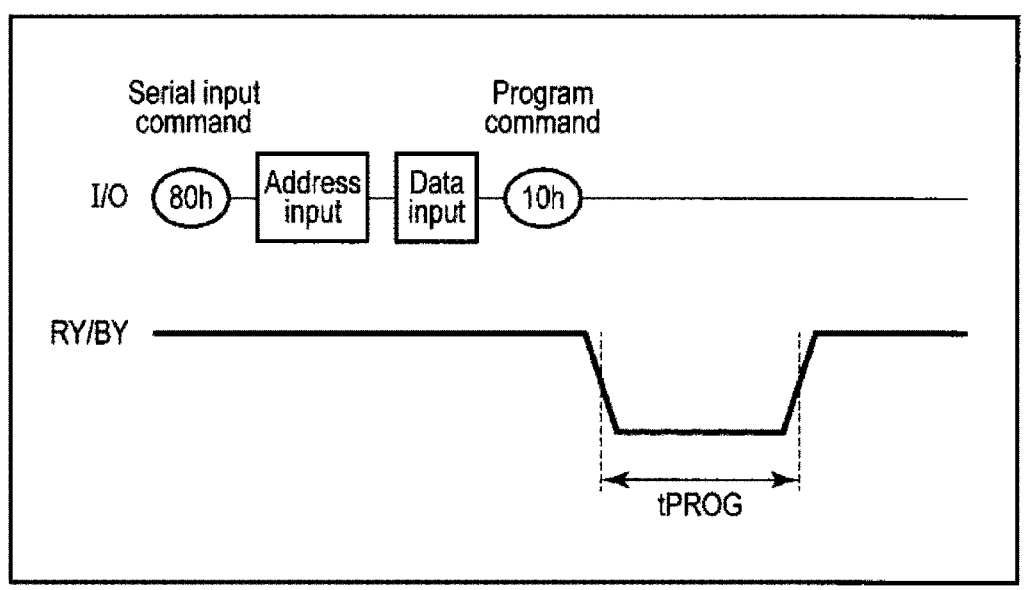
FIG. 31 is a timing chart illustrating the sequence of a write operation executed by a memory controller provided in the memory system according to the first embodiment.

Referring to FIGS. 30 and 31, descriptions will be made on a difference between the operation of the memory controller connected to the semiconductor storage device that notifies the write failure and the operation of the memory controller 4 connected to the semiconductor storage device 5 that does not notify the write failure according to the present embodiment.

The timing chart in FIG. 30 represents an example of a program operation sequence on a certain page of a certain block in a memory cell array in a semiconductor storage device that notifies a write failure. The memory controller (in particular, NAND I/F) transmits a serial input command "80h," an address that specifies the block and page where the program operation is executed, data to be written, and a program start command "10h" to the semiconductor storage device via the input/output buffer. The memory controller monitors the ready/busy signal (RY/BY) of the semiconductor storage device and waits for the completion of the program operation. While the program operation is being executed in the semiconductor storage device (tPROG), the semiconductor storage device is kept in the busy state. Further, the memory controller updates the logical-to-physical address conversion table while the program operation is being executed.

The semiconductor storage device executes a verification operation to verify whether the program operation has succeeded. The program and verification operations are repeated until the program operation succeeds or the number of loops of the program and the verification operation reaches a set maximum number of loops. When the program and verification operations are completed, the semiconductor storage device returns to the ready state. When the semiconductor storage device becomes ready, the memory controller transmits a status read command "70h" to the semiconductor storage device via the input/output buffer. When the program operation succeeds, a status indicating a success (pass status) is notified from the semiconductor storage device to the memory controller. On the other hand, when the program operation does not succeed, a status indicating a failure (fail status) is notified from the semiconductor storage device to the memory controller.

When a status indicating a failure is notified, the memory controller determines the address at which the program operation is newly performed (i.e., the block and the page). In addition, when a block having a page where the write failed constitutes a sector, a new write sector including the same number of blocks as the sector is secured as described above with reference to FIG. 13. This is because data is continuously written in a certain sector so that the write performance and the read performance are not degraded. The memory controller determines the address at which the program operation is newly executed in the newly secured write sector.

Then, in order to request data writing to a new address, the memory controller transmits again the serial input command "80h," the address that specifies the block and the page where the program operation is executed, the data to be written, and the program start command "10h" to the semiconductor storage device via the input/output buffer. Also, while the program operation is being executed by the semiconductor storage device and in the busy state, the memory controller updates again the logical-to-physical address conversion table.

When the semiconductor storage device returns from the busy state to the ready state, the memory controller transmits the status read command "70h" to the semiconductor storage device via the input/output buffer. The memory controller receives a status indicating a success or a status indicating a failure from the semiconductor storage device.

The memory controller repeats the operation from transmitting the above-described serial input command to receiving the status notification until, for example, the status indicating the success of the writing is notified from the semiconductor storage device to the memory controller. The logical-to-physical address conversion table is updated every time this operation is performed. Therefore, when the logical-to-physical address conversion table is a table having an enormous amount of data, it takes time to update the logical-to-physical address conversion table, and the efficiency of processing performed for writing to the semiconductor storage device is degraded.

In addition, as described above, data is written to a new write sector in accordance with a write failure to a certain page. Therefore, in the original sector, a page that is not used to write data is generated although the page is a page in a normal block, not a defective block.

The timing chart in FIG. 31 illustrates an example of a program operation sequence to a certain page of a certain block in the memory cell array 31 in the semiconductor storage device 5 of the present embodiment. The memory controller 4 (NAND I/F 13) transmits the serial input command "80h," the address that specifies the block and the page where the program operation is performed, the data to be written, and the program start command "10h" to the semiconductor storage device 5 via the input/output buffer 32. The memory controller 4 monitors the ready/busy signal (RY/BY) of the semiconductor storage device 5 and waits for the completion of the program operation. While the program operation is being performed in the semiconductor storage device 5 (tPROG), the semiconductor storage device 5 is kept in the busy state. Also, while the program operation is being performed, the memory controller 4 updates the logical-to-physical address conversion table 21.

The semiconductor storage device 5 performs a verification operation to verify whether the program operation has succeeded. The program and verification operations are repeated until the program operation succeeds or the number of loops of the program and verification operations reaches a set maximum number of loops. When the program and verification operations are completed and the program operation succeeds, the semiconductor storage device 5 returns to the ready state.

When the program and verification operations are completed, and the program operation fails, the semiconductor storage device 5 performs the program and verification operations for the page in the replacement block to replace the page in the block where the write failed, in the busy state. The semiconductor storage device returns to the ready state when the program and verification operations for the replacement block are completed and the program operation succeeds. On the other hand, when the program operation fails, the program and verification operations for another replacement block are performed. That is, the program and verification operations are repeated until the program operation for the replacement block succeeds.

As described above, even when the program operation requested from the memory controller 4 fails, the semiconductor storage device 5 does not notify the memory controller 4 of the failure, and performs a program operation to write the data, which fails to be written to another block in the semiconductor storage device 5. Further, the memory controller 4 transmits a program start command "10h" to request a program operation to the semiconductor storage device 5, and then performs no processing with the semiconductor storage device 5 with respect to the program operation. Therefore, the program operation to the page of the replacement block may be performed efficiently in the semiconductor storage device 5 without notifying the memory controller 4 of the failure after the program operation to the page in a certain block fails.

With reference to the flowcharts of FIGS. 32 and 33, descriptions will be made on a write processing by the memory controller and the semiconductor storage device that notifies the memory controller of the failure at the time of write failure. Unlike the semiconductor storage device of the present embodiment, the semiconductor storage device does not have a replacement function of writing data to another block without notifying the memory controller of a failure at the time of write failure.

Figure 32:
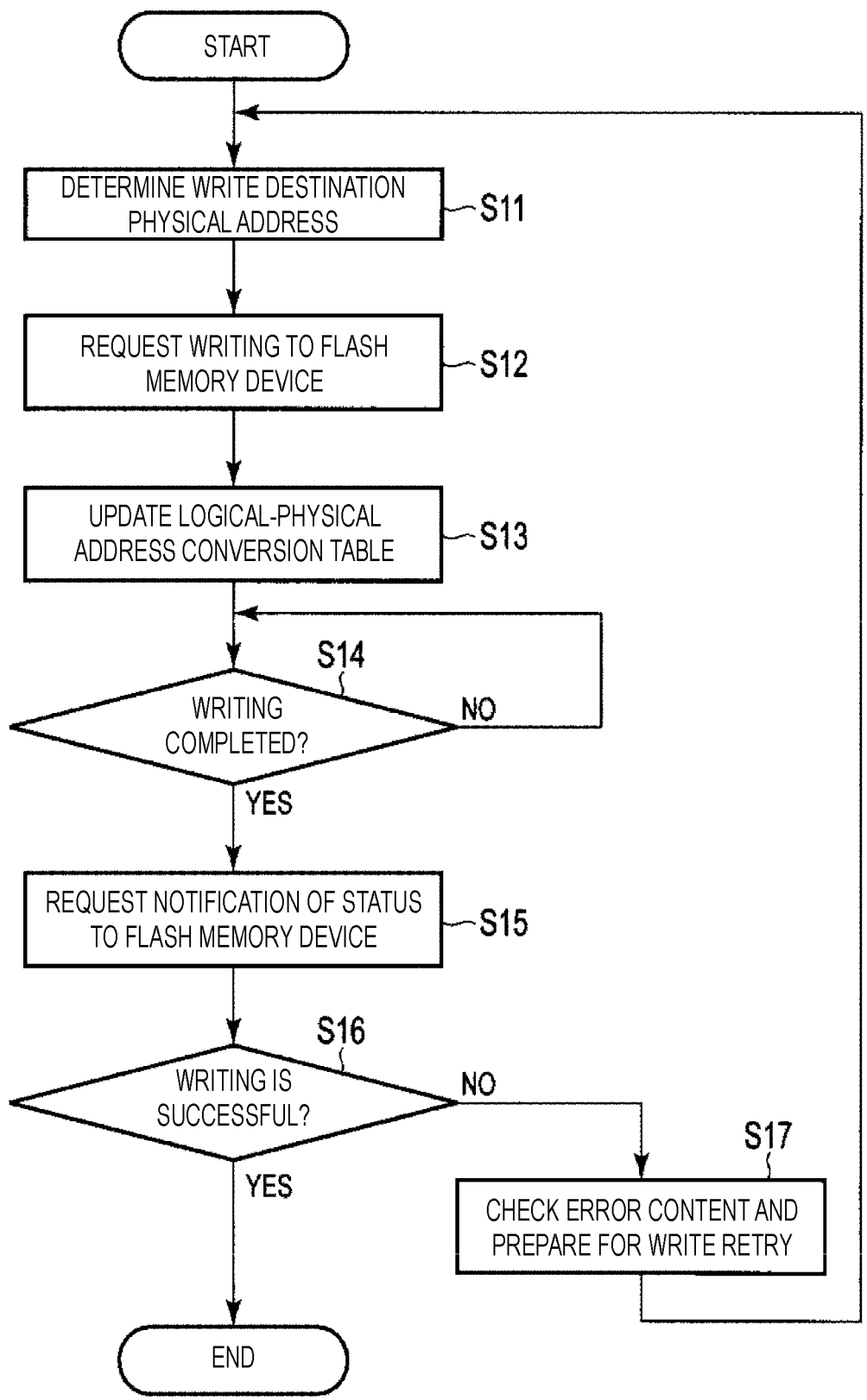
FIG. 32 is a flowchart illustrating an example of the sequence of a write processing executed by the memory controller.

The flowchart of FIG. 32 illustrates an example of the sequence of a write processing executed by the memory controller.

When writing data to a certain logical address, the memory controller determines a physical address in which the data is written (write destination physical address) (step S11). The memory controller requests that the semiconductor storage device write data to the page of the block corresponding to the write destination physical address (step S12). Then, the memory controller updates the logical-to-physical address conversion table using an entry indicating the logical address and the physical address in step S11 (step S13).

Subsequently, the memory controller determines whether the writing by the semiconductor storage device has been completed (step S14). The memory controller monitors the ready/busy signal (RY/BY) of the semiconductor storage device, requests writing, and determines that writing has been completed in response of the return from the busy state to the ready state. More specifically, the memory controller determines whether the program operation and the verification operation by the semiconductor storage device have been completed. The memory controller monitors the ready/busy signal (RY/BY) of the semiconductor storage device, transmits a program start command, and determines that the program operation and the verification operation have been completed in response of the return from the busy state to the ready state.

When the writing has not been completed ("NO" in step S14), the processing returns to step S14 to determine again whether the writing by the semiconductor storage device has been completed. Therefore, the memory controller waits for the execution of the subsequent sequence until the writing by the semiconductor storage device has been completed.

On the other hand, when the writing has been completed ("YES" in step S14), the memory controller requests that the semiconductor storage device notify the status (step S15). When the program operation succeeds, a status indicating a success is notified from the semiconductor storage device to the memory controller. On the other hand, when the program operation fails, a status indicating a failure is notified from the semiconductor storage device to the memory controller.

Based on the notified status, the memory controller determines whether the writing succeeds (step S16). When the writing succeeds ("YES" in step S16), the processing is terminated.

When the writing fails ("NO" in step S16), the memory controller checks the contents of the error, prepares for a write retry (step S17), and returns to step S11. That is, a procedure is executed again to write data which has failed to be written to another physical address in the semiconductor storage device.

Figure 33:
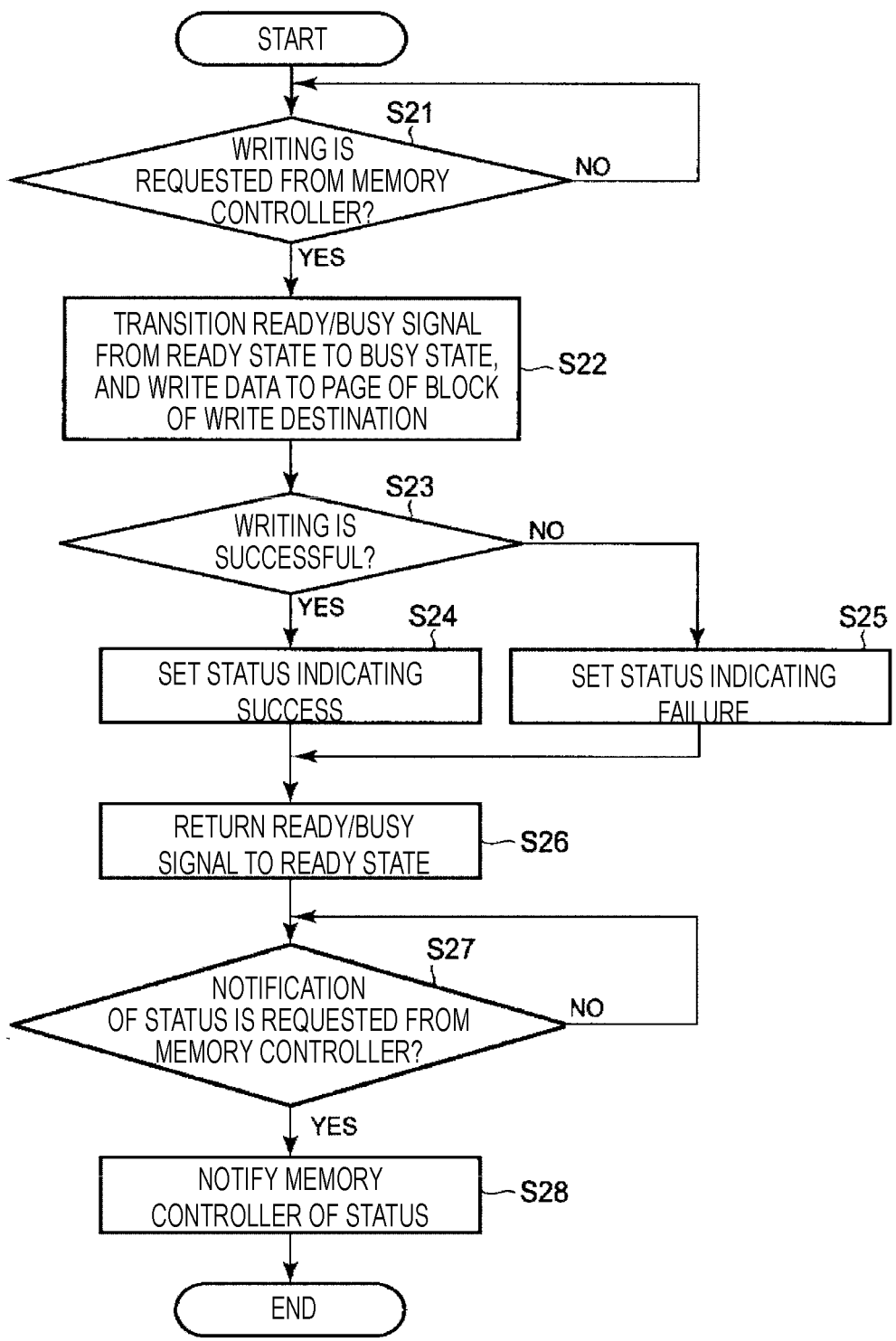
FIG. 33 is a flowchart illustrating an example of the sequence of a write processing executed by the semiconductor storage device.

The flowchart of FIG. 33 illustrates an example of the sequence of the write processing executed by the semiconductor storage device that notifies the memory controller of a failure at the time of write failure.

The semiconductor storage device determines whether writing is requested from the memory controller (step S21). In a request for writing by the memory controller, an address that designates a block and a page of a write destination and data to be written are transmitted from the memory controller to the semiconductor storage device. When writing is not requested ("NO" in step S21), the processing returns to step S21.

On the other hand, when writing is requested ("YES" in step S21), the semiconductor storage device transitions the ready/busy signal RY/BY from the ready state to the busy state and writes the data to the page of the block of the write destination (step S22). More specifically, the semiconductor storage device executes a program operation to program data on a page of a block of the write destination, and executes a verification operation to verify whether the program operation succeeds. The program and verification operations are repeated until the program operation succeeds or the number of loops of the program and the verification operation reaches a set maximum number of loops.

When the write operation (i.e., the program and the verification operation) is completed and the writing succeeds ("YES" in step S23), the semiconductor storage device sets the status indicating a success in the input/output buffer (status register) (step S24). On the other hand, when the writing fails ("NO" in step S23), the semiconductor storage device sets the status indicating a failure in the input/output buffer (step S25). Then, the semiconductor storage device returns the ready/busy signal RY/BY to the ready state (step S26).

Subsequently, the semiconductor storage device determines whether notification of the status is requested from the memory controller (step S27). When notification of the status is not requested ("NO" in step S27), the processing returns to step S27.

When notification of the status is requested ("YES" in step S27), the semiconductor storage device notifies the memory controller of the status indicating a success or failure of writing (step S28), and ends the processing.

As described above, when the writing in the semiconductor storage device fails, the memory controller executes the write operation to retry writing on the semiconductor storage device in response to the notification by the semiconductor storage device. Such a write retry causes the data to be written to be fragmented, and the access performance may be degraded. In addition, the logical-to-physical address conversion table is updated every time the write retry is performed. When the logical-to-physical address conversion table has an enormous size, it takes time to perform the update processing, and the efficiency of processing performed for writing to the semiconductor storage device is degraded.

Figure 34:
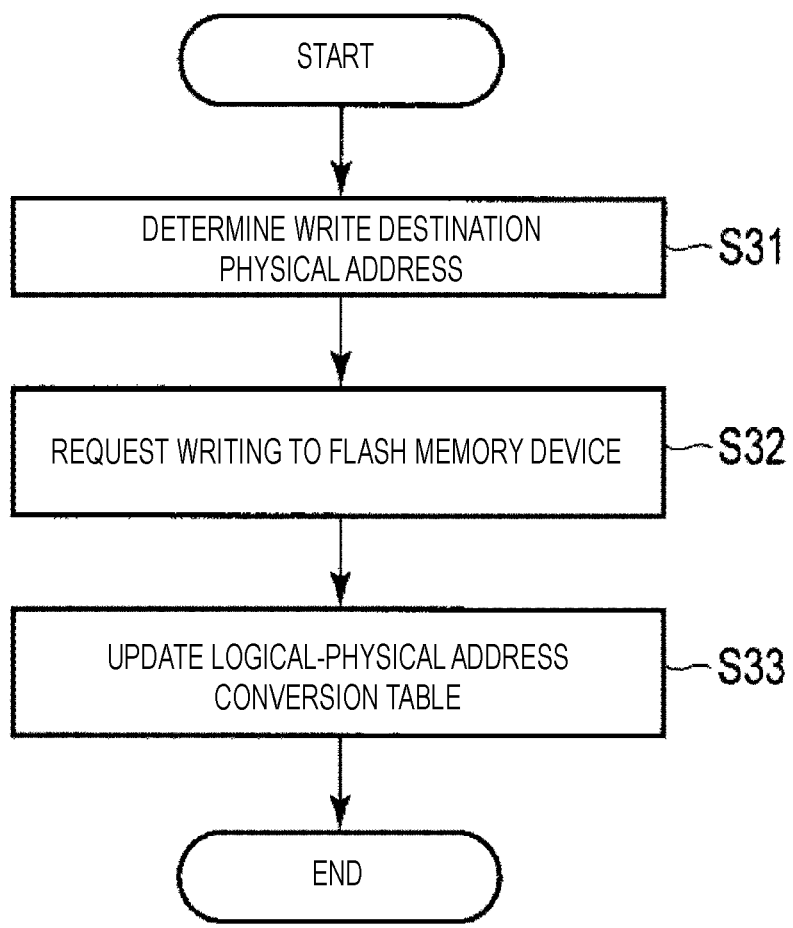
FIG. 34 is a flowchart illustrating an example of the sequence of a write processing executed by the memory controller provided in the memory system according to the first embodiment.
Figure 35:
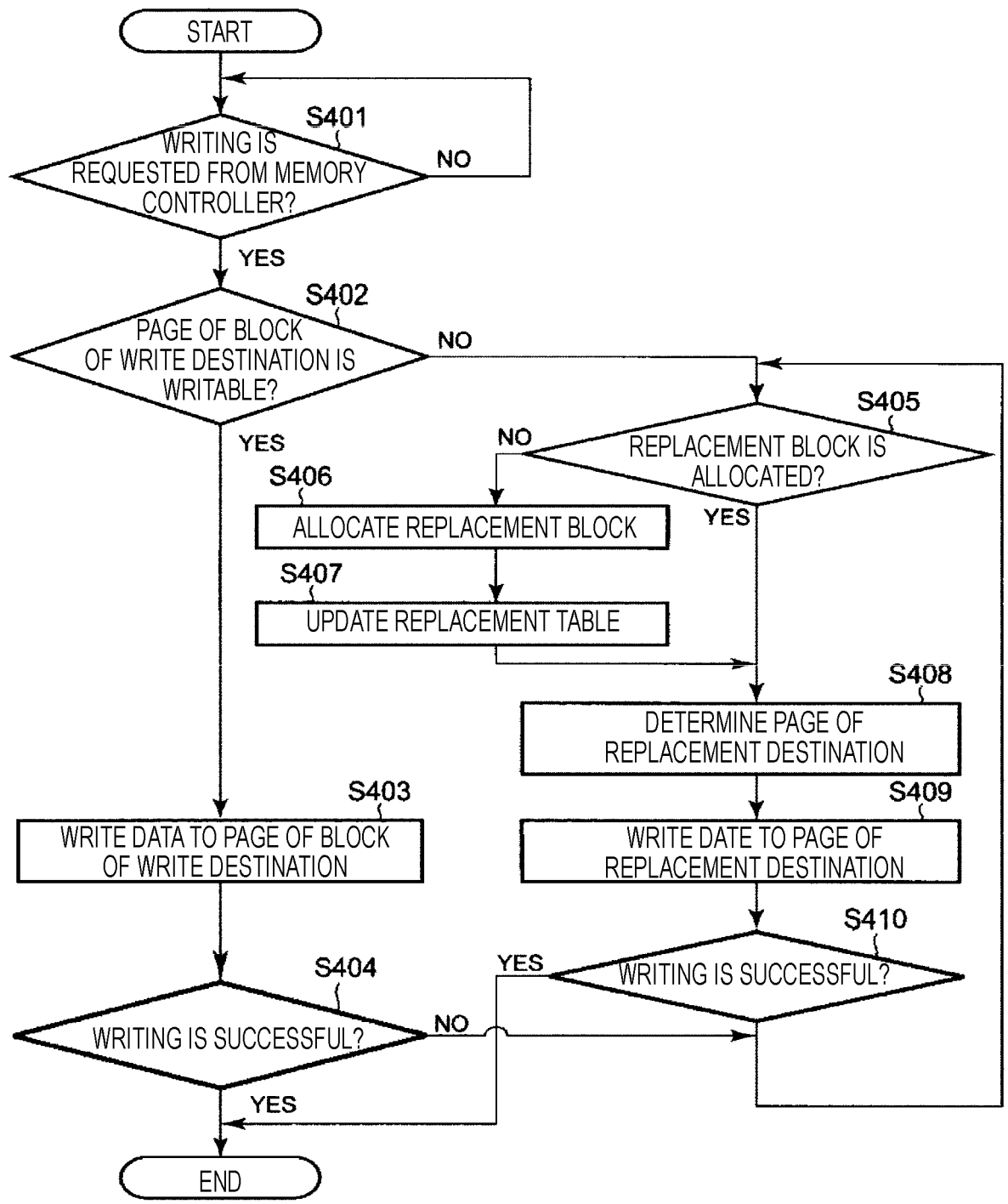
FIG. 35 is a flowchart illustrating an example of the sequence of a write processing executed by the semiconductor storage device provided in the memory system according to the first embodiment.

The flowcharts of FIGS. 34 and 35 illustrate examples of the write processing executed by the memory controller 4 and the semiconductor storage device 5 of the present embodiment. The semiconductor storage device 5 has a replacement function of writing data to another block without notifying the memory controller 4 of a failure at the time of a write failure.

With reference to the flowchart of FIG. 34, descriptions will be made on an example of the sequence of the write processing executed by the memory controller 4.

When data is written to a certain logical address, the memory controller 4 determines a physical address where the data needs to be written (step S31). The memory controller 4 requests that the semiconductor storage device 5 write data to a page of a block corresponding to the write destination physical address (step S32). Then, the memory controller 4 updates the logical-to-physical address conversion table 21 using the entry indicating the logical address and the physical address in step S31 (step S33), and ends the processing.

In this manner, the memory controller 4 only needs to request writing to the semiconductor storage device 5, and does not need to request notification of the success/failure of the writing or to perform a processing for write retry at the time of the write failure.

The flowchart of FIG. 35 illustrates an example of the sequence of the write processing executed by the semiconductor storage device 5.

The semiconductor storage device 5 determines whether writing is requested from the memory controller 4 (step S401). In a request for writing by the memory controller 4, an address that designates a block and a page of the write destination and data to be written are transmitted from the memory controller 4 to the semiconductor storage device 5. When writing is not requested ("NO" in step S401), the processing returns to step S401.

On the other hand, when writing is requested ("YES" in step S401), the semiconductor storage device 5 uses the replacement table 38 to determine whether the page of the block designated as the write destination address by the memory controller 4 is writable (step S402).

When the page of the block of the write destination is writable ("YES" in step S402), the semiconductor storage device 5 writes data to the page of the block of the write destination (step S403). More specifically, the semiconductor storage device 5 executes a program operation to program data to a page of a block of the write destination, and executes a verifying operation to verify whether the program operation has succeeded. The program and verification operations are repeated until the program operation succeeds or the number of loops of the program and the verification operation reaches a set maximum number of loops.

When the write operation (i.e., the program and the verification operation) has been completed, the semiconductor storage device 5 determines whether the writing succeeds (step S404). When the writing succeeds ("YES" in step S404), the processing is terminated.

When the writing fails ("NO" in step S404), or when the page of the block of the write destination is not writable ("NO" in step S402), the semiconductor storage device 5 determines whether the replacement block for replacement of the write destination has been allocated (step S405). When no replacement block has been allocated ("NO" in step S405), the semiconductor storage device 5 selects one block from the free block group that does not include valid data, performs an erase processing, and allocates the block as a replacement block (step S406). Then, the semiconductor storage device 5 updates the replacement table 38 (step S407). The semiconductor storage device 5 adds an entry indicating the physical storage position where the write failed and an entry indicating the physical storage position replaced from the write destination to the replacement table 38.

When a replacement block is allocated ("YES" in step S405), steps S406 and S407 are skipped.

Subsequently, the semiconductor storage device 5 determines the replacement destination page in the replacement block (step S408). The semiconductor storage device 5 writes the data to the determined replacement destination page (step S409). Then, the semiconductor storage device 5 determines whether the writing succeeds (step S410). When the writing fails ("NO" in step S410), the processing returns to step S405 and a procedure of writing data in another replacement destination is executed.

Meanwhile, when the writing succeeds ("YES" in step S410), the processing is terminated.

According to the above-described configuration, according to the first embodiment, it is possible to efficiently rewrite data after failure of data writing in the semiconductor storage device. When the memory controller 4 requests writing of first data to the first page in the first block in the memory cell array 31, when the writing of the first data to the first page fails, the replacement controller 34 writes the first data to the second block in the memory cell array 31 without notifying the memory controller 4 of the failure of the writing.

Therefore, it is possible to provide the memory controller 4 with a simple interface that may request an additional write without considering the write failure in the semiconductor storage device 5. The memory controller 4 does not perform error processing in response to a write failure, and data for the error processing is not transferred between the memory controller 4 and the semiconductor storage device 5. Thus, the processing for coping with the write failure can be simplified and accelerated.

Further, in the semiconductor storage device 5, the blocks where the write failed and the blocks used for the replacement are managed using the replacement table 38. As a result, defective blocks where the write has failed may be recognized using the replacement table 38, so that the defective block management in the memory controller 4 becomes unnecessary.

Second Embodiment

In the first embodiment, the memory controller 4 and the semiconductor storage device 5 exchange control signals, commands, addresses, and data via the NAND interface 13 and the input/output buffer 32. In contrast, in the second embodiment, a module including a replacement controller 34 that replaces a block where the write failed with another block is provided between the NAND interface 13 and the input/output buffer 32.

The configuration of the memory system 1 according to the second embodiment is the same as that of the memory system 1 according to the first embodiment. The second embodiment and the first embodiment are different from each other only in that a module including the replacement controller 34 and the RAM 35, and a module including a memory cell array 31, an input/output buffer 32, a control circuit 33, and a peripheral circuit 36 are separately provided in the semiconductor storage device 5. Only the differences from the first embodiment will be described below.

Figure 36:
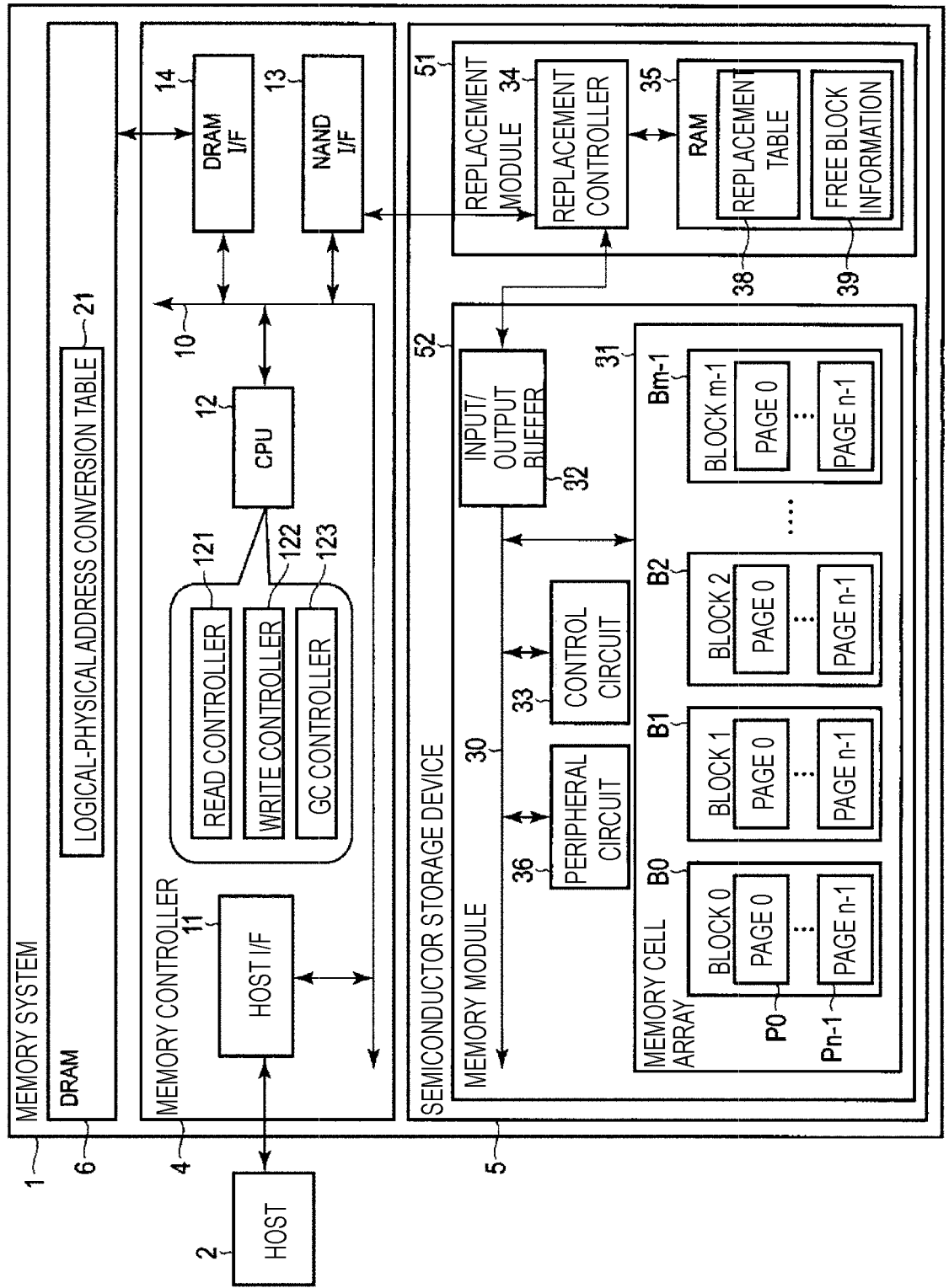
FIG. 36 is a block diagram illustrating an example of the configuration of the memory system according to a second embodiment.

As illustrated in FIG. 36, the semiconductor storage device 5 includes a replacement module 51 and a memory module 52. The replacement module 51 includes a replacement controller 34 and a RAM 35. The memory module 52 includes a memory cell array 31, an input/output buffer 32, a control circuit 33, and a peripheral circuit 36. Each of the replacement module 51 and the memory module 52 is installed on separate chips. Further, a chip on which the replacement module 51 is mounted and a chip on which the memory module 52 is mounted are contained in the same package (i.e., in one semiconductor storage device 5).

The replacement controller 34 detects through the input/output buffer 32 that the control circuit 33 has failed to write data to a certain page of a certain block. The replacement controller 34 determines the replacement destination block in accordance with the detected write failure, and requests that the control circuit 33 write the data which has failed to be written to the page in the block of the write destination (e.g., the front page, the page with the same page number as the page that fails to be written, etc.). More specifically, for this request, the replacement controller 34 transmits, for example, the serial input command "80h," the address that specifies the block and the page of the write destination where the program operation is performed, the data to be written, and the program start command "10h" to the input/output buffer 32. The control circuit 33 performs a write operation of data to a page in the block of the replacement destination in accordance with this request. The replacement controller also adds an entry to the replacement table 38 that includes a write failure position indicating a page in a block where the write has failed and a replacement position indicating a block of the replacement destination.

Further, the replacement controller 34 uses the replacement table 38 to detect the external control signals, commands, addresses, and data related to replacement of blocks among the external control signals, commands, addresses, and data supplied from the memory controller 4 to the semiconductor storage device 5. More specifically, the replacement controller 34 detects the external control signals, commands, addresses, and data related to, for example, the write request to the page after the page where the write failed, or the read request from the page after the page where the write failed, by the memory controller 4.

The replacement controller 34 converts a write request to the page after the page where the write failed into a write request to the page in the corresponding replacement block, and transmits the external control signals, commands, addresses, and data corresponding to the converted write request to the input/output buffer 32. Further, the replacement controller 34 converts the read request from the page after the page where the write failed into a read request from the page in the corresponding replacement block, and transmits the external control signals, commands, addresses, and data corresponding to the converted read request to the input/output buffer 32. The replacement controller 34 also directly transmits the external control signals, commands, addresses, and data that are not related to the replacement of the block to the input/output buffer 32 as they are.

The control circuit 33 controls the write operation, the erase operation, and the read operation of data based on various external control signals, commands, and addresses supplied through the input/output buffer 32, as in the above-described operation in the first embodiment.

The chip on which the replacement module 51 is mounted and the chip on which the memory module 52 is mounted may be respectively contained in separate packages. For example, while the chip of the memory module 52 is contained in the package of the semiconductor storage device 5, the chip of the replacement module 51 may be contained in a package separate from the chip of the memory module 52.

As described above, according to the first and second embodiments, it is possible to efficiently rewrite data after failure of data writing in the semiconductor storage device. The memory system 1 includes a semiconductor storage device 5 and a memory controller 4 electrically connected to the semiconductor storage device 5. The semiconductor storage device 5 includes a memory cell array 31 including plural blocks and a replacement controller 34. When the memory controller 4 requests writing of first data to the first page in the first block in the memory cell array 31, when the writing of the first data to the first page fails, the replacement controller 34 writes the first data to the second block in the memory cell array 31 without notifying the memory controller 4 of the failure of the writing.

As described above, since the first data that has failed to be written may be written to a separate second block without performing any processing with the memory controller 4, it is possible to efficiently rewrite the data after the failure in writing.

In the first and second embodiments, a NAND type flash memory is illustrated as an example of a nonvolatile memory. However, the functions of these embodiments are also applicable to other various nonvolatile memories such as a magnetoresistive random access memory (MRAM), a phase change random access memory (PRAM), a resistive random access memory (ReRAM), or a ferroelectric random access memory (FeRAM).

Further, each of the various functions described in the first and second embodiments may be implemented by a circuit (processing circuit). Examples of the processing circuit include a programmed processor such as a central processing unit (CPU). A processor executes each of the above-described functions by executing a computer program stored in the memory (instruction group). The processor may be a microprocessor including an electric circuit. Examples of the processing circuit include digital signal processors (DSPs), application specific integrated circuits (ASICs), microcontrollers, controllers, and other electrical circuit components. Each of the components other than the CPU described in the embodiments may also be implemented by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a controller and a first volatile memory in which an address conversion table mapping logical addresses to physical addresses is stored; and
a semiconductor storage device including a nonvolatile memory having a first block including a first page and a second page, and a second block including a third page, and a second volatile memory in which a replacement table is stored, and configured to execute commands from the controller, wherein
in response to a write command from the controller to write data into the second page in the first block, the semiconductor storage device performs a write operation to write the data into the second page, and upon detecting failure of writing the data into the second page, the semiconductor storage device performs another write operation to write the data into the third page in the second block, without notifying the controller of the failure of writing the data into the second page,
wherein, when said another write operation is performed, information that indicates that the data is stored in the third page instead of the second page is stored in the replacement table and the address conversion table is not updated, and
wherein, after the write operation to write the data into the third page in the second block succeeds and the information that indicates that the data is stored in the third page instead of the second page, is stored in the replacement table,
in response to a first read command from the controller to read data from the second page in the first block, the semiconductor storage device performs a read operation to read the data from the third page in the second block, and in response to a second read command from the controller to read data from the first page in the first block, the semiconductor storage device performs a read operation to read the data from the first page in the first block.

2. The memory system according to claim 1, wherein
after the write operation to write the data into the third page in the second block succeeds, in response to another write command to write additional data into a fourth page in the first block, the semiconductor storage device performs a write operation to write the additional data into a fifth page in the second block.

3. The memory system according to claim 1, wherein
upon detecting the failure of writing the data into the third page in the second block, the semiconductor storage device performs another write operation to write the data into a sixth page in a third block of the nonvolatile memory.

4. The memory system according to claim 1, wherein
at the time of the write operation to write the data into the second page in the first block, valid data is already stored in the first page in the first block, and
at the time of the write operation to write the data into the third page in the second block, no other valid data is stored in the second block.

5. The memory system according to claim 1, wherein
at the time of the write operation to write the data into the second page in the first block, valid data is already stored in the first page in the first block, and
prior to the write operation to write the data into the third page in the second block, the valid data is written into a seventh page in the second block.

6. The memory system according to claim 1, wherein the data is written into the third page in the second block having a page number that is different from a page number designated in the write command.

7. The memory system according to claim 1, wherein the data is written into the third page in the second block having a page number that is the same as a page number designated in the write command.

8. The memory system according to claim 1, wherein the semiconductor storage device stores a mapping of the first block and the second page to the second block in the replacement table and consults the mapping in response to the first read command.

9. The memory system according to claim 1, wherein
at the time of the first read command and the second read command, the first block has valid data stored therein.

10. A method of processing a write command from a controller in a semiconductor storage device, wherein the controller uses an address conversion table stored in a first volatile memory to manage mapping of logical addresses to physical addresses, and the semiconductor storage device includes a nonvolatile memory having a first block including a first page and a second page, and a second block including a third page, and a second volatile memory in which a replacement table is stored, said method comprising:
in response to a write command from the controller to write data into the second page in the first block, performing a write operation to write the data into the second page; and
upon detecting failure of writing the data into the second page, performing another write operation to write the data into the third page in the second block, without notifying the controller of the failure of writing the data into the-second page, wherein, when said another write operation is performed, information that indicates that the data is stored in the third page instead of the second page is stored in the replacement table and the address conversion table is not updated, and
wherein, after the write operation to write the data into the third page in the second block succeeds and the information that indicates that the data is stored in the third page instead of the second page, is stored in the replacement table,
in response to a first read command from the controller to read data from the second page in the first block, performing a read operation to read the data from the third page in the second block, and
in response to a second read command from the controller to read data from the first page in the first block, performing a read operation to read the data from the first page in the first block.

11. The method according to claim 10, further comprising:
after the write operation to write the data into the third page in the second block succeeds, in response to another write command to write additional data into a fourth page in the first block, performing a write operation to write the additional data into a fifth page in the second block.

12. The method according to claim 10, further comprising:
upon detecting the failure of writing the data into the third page in the second block, performing another write operation to write the data into a sixth page in a third block of the nonvolatile memory.

13. The method according to claim 10, wherein
at the time of the write operation to write the data into the second page in the first block, valid data is already stored in the first page in the first block, and
at the time of the write operation to write the data into the third page in the second block, no other valid data is stored in the second block.

14. The method according to claim 10, wherein
at the time of the write operation to write the data into the second page in the first block, valid data is already stored in the first page in the first block, and
prior to the write operation to write the data into the third page in the second block, the valid data is written into a seventh page in the second block.

15. The method according to claim 10, wherein the data is written into the third page in the second block having a page number that is different from a page number designated in the write command.

16. The method according to claim 10, wherein the data is written into the third page in the second block having a page number that is the same as a page number designated in the write command.

17. The method according to claim 10, further comprising:
storing a mapping of the first block and the second page to the second block in the replacement table; and
consulting the mapping in response to the first read command.

18. The method according to claim 10, wherein
at the time of the first read command and the second read command, the first block has valid data stored therein.

* * * * *